United States Patent
Istre et al.

(10) Patent No.: US 7,325,326 B1
(45) Date of Patent: Feb. 5, 2008

(54) METHOD AND APPARATUS FOR BEST FITTING TWO OR MORE ITEMS

(75) Inventors: Michael Istre, Mandeville, LA (US); Kenneth Breaux, Metairie, LA (US); Dalan Bayham, Violet, LA (US); Hung Tran, New Orleans, LA (US); Christopher Dubea, Slidell, LA (US)

(73) Assignee: Project Consulting Services, Inc., Metairie, LA (US)

( * ) Notice: Subject to any disclaimer, the term of this patent is extended or adjusted under 35 U.S.C. 154(b) by 0 days.

(21) Appl. No.: 11/463,091

(22) Filed: Aug. 8, 2006

Related U.S. Application Data

(60) Continuation of application No. 11/285,538, filed on Nov. 22, 2005, now Pat. No. 7,086,169, which is a division of application No. 10/914,414, filed on Aug. 9, 2004, now Pat. No. 6,996,914.

(51) Int. Cl.
*G01B 5/25* (2006.01)
*G01B 1/00* (2006.01)

(52) U.S. Cl. ............... 33/645; 33/529; 29/407.05

(58) Field of Classification Search ............ 33/227, 33/286, 501.02, 501.03, 501.04, 529, 542, 33/543, 549–554, 555.1, 562, 563, 613, 645; 29/407.01, 407.05, 407.09, 407.1; 702/33, 702/179, 181, 182, 189; 703/1
See application file for complete search history.

(56) References Cited

U.S. PATENT DOCUMENTS

| | | |
|---|---|---|
| 3,808,696 A | 5/1974 | Possati |
| 3,921,300 A | 11/1975 | Cox et al. |
| 4,137,639 A | 2/1979 | Zumbach |
| 4,176,461 A | 12/1979 | Gebel et al. |
| 4,406,285 A | 9/1983 | Villasenor et al. |
| 4,978,223 A | 12/1990 | Kutchenriter et al. |
| 5,052,121 A | 10/1991 | Wachtler |
| 5,125,161 A | 6/1992 | Guthrie |
| 5,351,410 A | 10/1994 | Hainneville |
| 5,359,781 A | 11/1994 | Melville |
| 5,412,877 A | 5/1995 | McKendrick |
| 5,461,793 A | 10/1995 | Melville |
| 5,502,898 A | 4/1996 | Manore |
| 5,577,328 A | 11/1996 | Kerry, Sr. |
| 5,619,587 A | 4/1997 | Willoughby, Jr. et al. |
| 5,711,083 A | 1/1998 | Bidwell |
| 5,933,231 A | 8/1999 | Bieman et al. |
| 6,289,600 B1 | 9/2001 | Watts |
| 6,357,129 B1 | 3/2002 | Gray et al. |
| 6,634,114 B2 | 10/2003 | Bidwell |
| 6,931,748 B2 | 8/2005 | Lam et al. |
| 6,996,914 B1 | 2/2006 | Istre et al. |
| 7,086,169 B1 | 8/2006 | Bayham et al. |
| 2001/0029677 A1 | 10/2001 | Bidwell |
| 2003/0100422 A1 | 5/2003 | Claeys |
| 2005/0089832 A1 | 4/2005 | McClusky |
| 2005/0171829 A1 | 8/2005 | Doyle et al. |

*Primary Examiner*—G. Bradley Bennett
(74) *Attorney, Agent, or Firm*—Garvey, Smith, Nehrbass & North, L.L.C.; Brett A. North

(57) ABSTRACT

What is provided in one embodiment is a method and apparatus for confirming that one or more items in a universe of items fall within specified tolerances. In another embodiment various methods for determining best fit between items in a universe of items is provided.

20 Claims, 16 Drawing Sheets

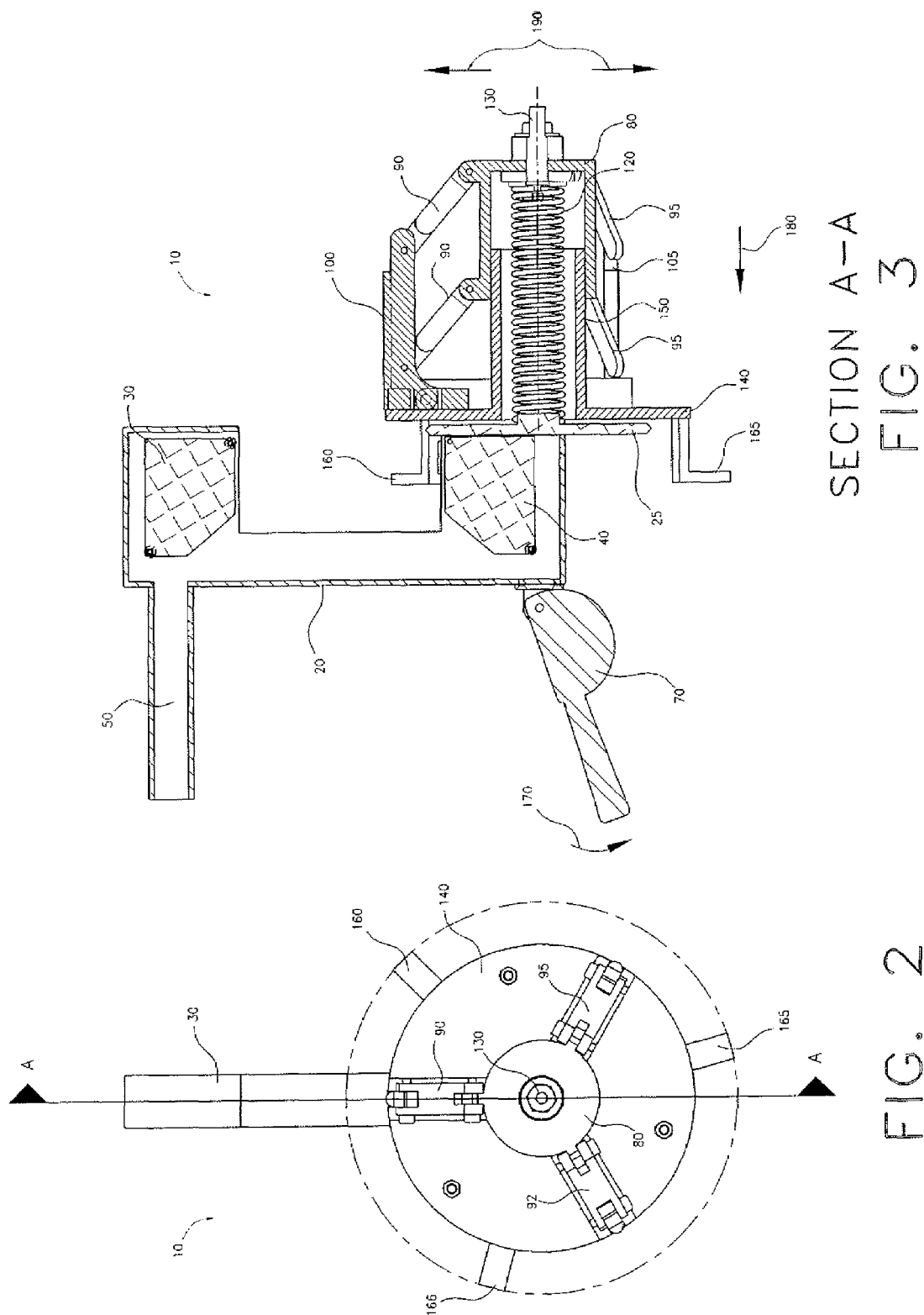

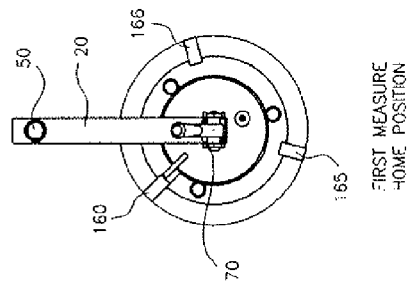
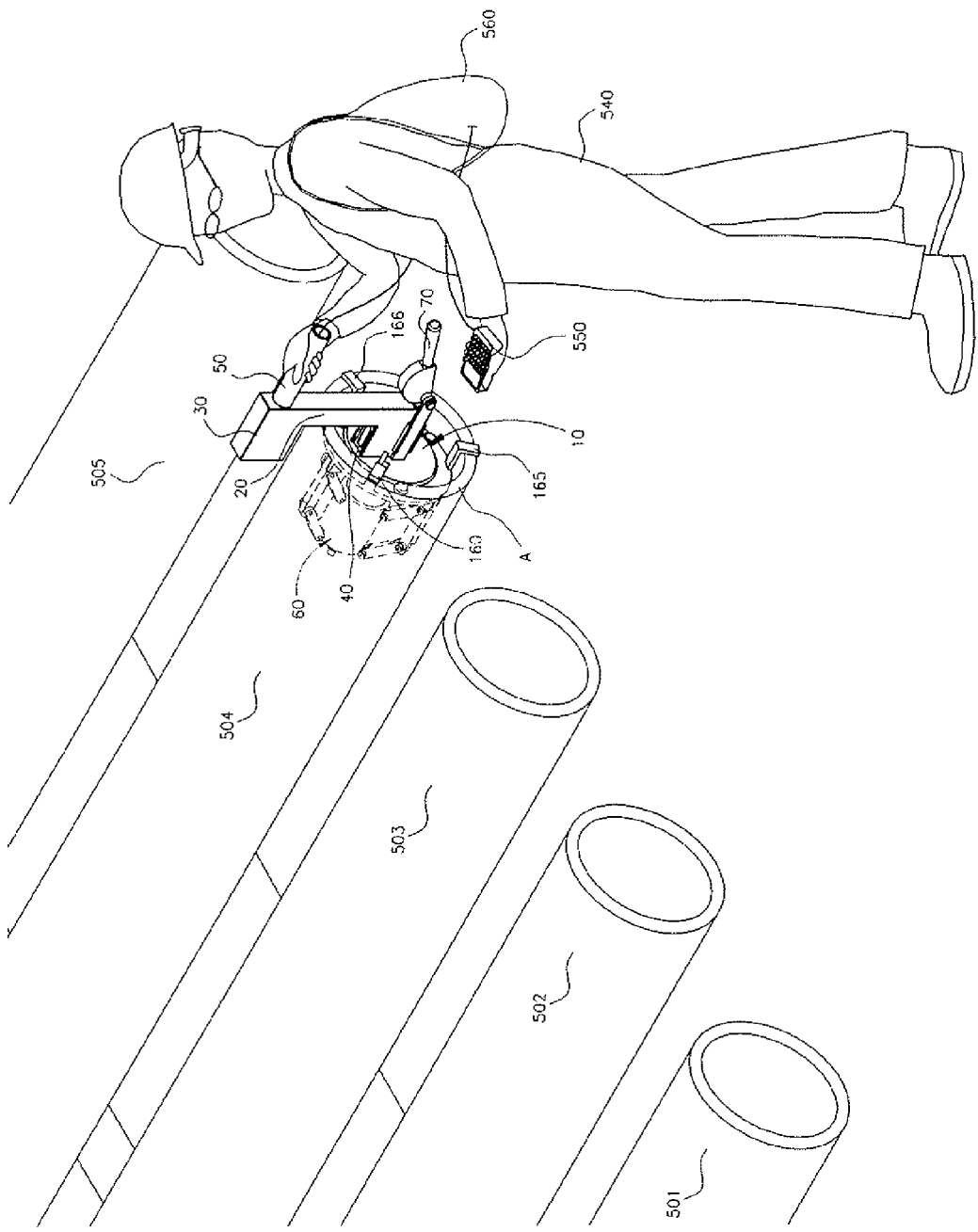
FIG. 10B
FIG. 10A

SECTION A-A

METHOD AND APPARATUS FOR BEST FITTING TWO OR MORE ITEMS

CROSS-REFERENCE TO RELATED APPLICATIONS

This application is a continuation of U.S. patent application Ser. No. 11/285,538, filed Nov. 22, 2005 (now U.S. Pat. No. 7,086,169), which application was a divisional application of U.S. patent application Ser. No. 10/914,414, filed Aug. 9, 2004 (now U.S. Pat. No. 6,996,914).

Priority is claimed to U.S. patent application Ser. No. 11/285,538, filed Nov. 22, 2005.

U.S. patent application Ser. No. 11/285,538, filed Nov. 22, 2005, is incorporated herein by reference.

Priority is claimed to U.S. patent application Ser. No. 10/914,414, filed Aug. 9, 2004.

U.S. patent application Ser. No. 10/914,414, filed Aug. 9, 2004, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to the field of measuring devices and a method and apparatus for measuring items. More particularly, the present invention relates to a method and apparatus for confirming that items in a universe of items, such as pipes, fall within specified tolerances. In an alternative embodiment the present invention relates to selecting a best fit between various items from a universe of items, such as a universe of pipes.

When selecting two pieces of pipe for joining from a universe of pipe it is desirable to select to pieces which fall within acceptable tolerances. For example, it may be desirable to ensure that the largest dimensional difference between two items to be joined is less than a set amount (e.g, less than 0.5 millimeters). It may also be desirable that, for a universe of items to be joined end to end, for those items which fall below the set largest dimensional difference, that the items to be joined be selected so that the dimensional differences between any two items be minimized. Minimizing the dimensional differences allows for the most favorable conditions to join items and minimizes stress concentrators at the joining points thereby increasing the factor of safety at the joints and reducing the risk of failure at a future point.

During the process selecting pipes to be joined from a universe of pipes, it is desirable to measure the pipe to ensure compliance with predetermined tolerances for quality control. Of particular concern are the dimensions of the pipe at its end that will form a juncture with a second piece of pipe. These measurements have traditionally been performed with simple "go/no-go" gauges, or at times with calipers.

Go/no-go gauges are mechanical articles of a fixed size which, when inserted, or attempted to be inserted, into a pipe will fit properly or not, indicating whether the tested pipe is acceptable. These gauges check the minimum or maximum dimensions at certain critical points in the ends. Calipers provide actual dimensions, but it is time consuming and subject to human error to measure the pipe with calipers or any other standard measuring device.

For a universe of pipes it would be desirable to have a system for taking various measurements of each pipe and automatically determining which pipes best fit each other and determine any pipe sections that need to be machined in order to bring the pipe into conformity with specified tolerances.

As with any manual system, human error is pervasive. An automated measuring system is needed. Some automated contact systems are available. Such systems typically use some form of linear variable differential transformer or linear potentiometer, both of which require a sensor to touch the surface of the unit under test. However, the interior surface of a pipe may be abrasive, and in a volume manufacturing process the sensor would wear out in an unacceptably short time. Using such contact sensors therefore would increase maintenance costs and process down time) while decreasing the reliability, and over time, the precision of the measurement system. Moreover, the range of most contact sensors is rather limited and is insufficient to measure large diameter pipe. As discussed previously, there are several points of interest on the pipe or tubular end. To measure multiple points with a contact system, the sensor would need to be removed from the surface, repositioned to the new location, and then placed in contact with the surface again.

Thus, there exists a need for a method and apparatus for selecting the best fit of two items between a universe of items along with a method for determining whether an item falls within specified tolerances; that will perform the selection process in a fast manner and minimize human error in making such determinations.

The following U.S. patents are incorporated herein by reference: U.S. Pat. No. 6,289,600.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided in one embodiment is a method and apparatus for confirming that one or more items in a universe of items fall within specified tolerances.

In another embodiment various methods for determining best fit between items in a universe of items is provided.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a front view of measuring device of FIG. 1 taken from the lines 2-2.

FIG. 3 is a sectional view of the measuring device of FIGS. 1 and 2 taken along the lines A-A.

FIG. 10A is a closeup of an individual taking a measurement of a pipe.

FIG. 10B is a side view of a pipe to be measured with a measurement apparatus installed in the pipe.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
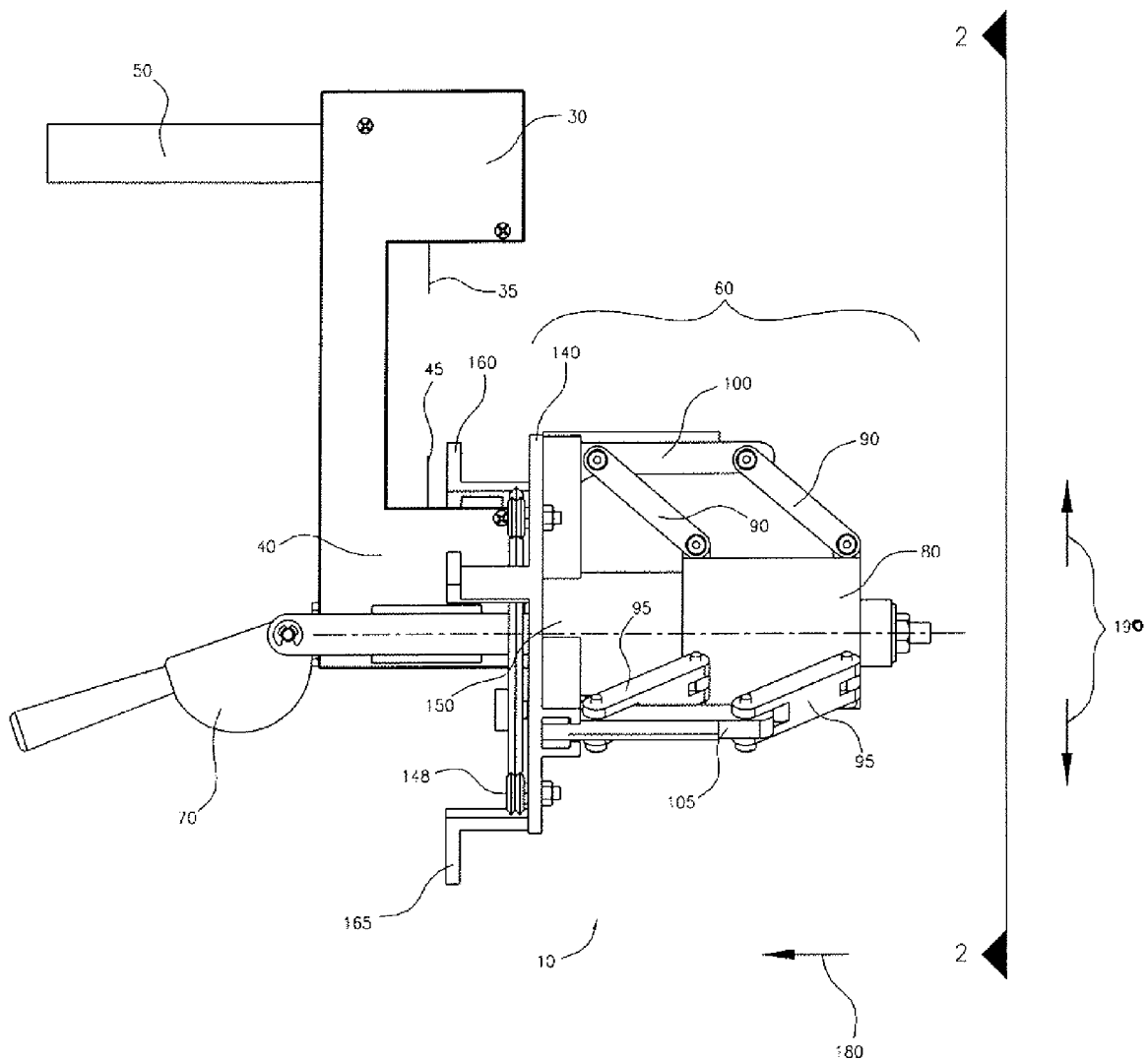
FIG. 1 is a side of a preferred embodiment of a measuring device.
Figure 4:
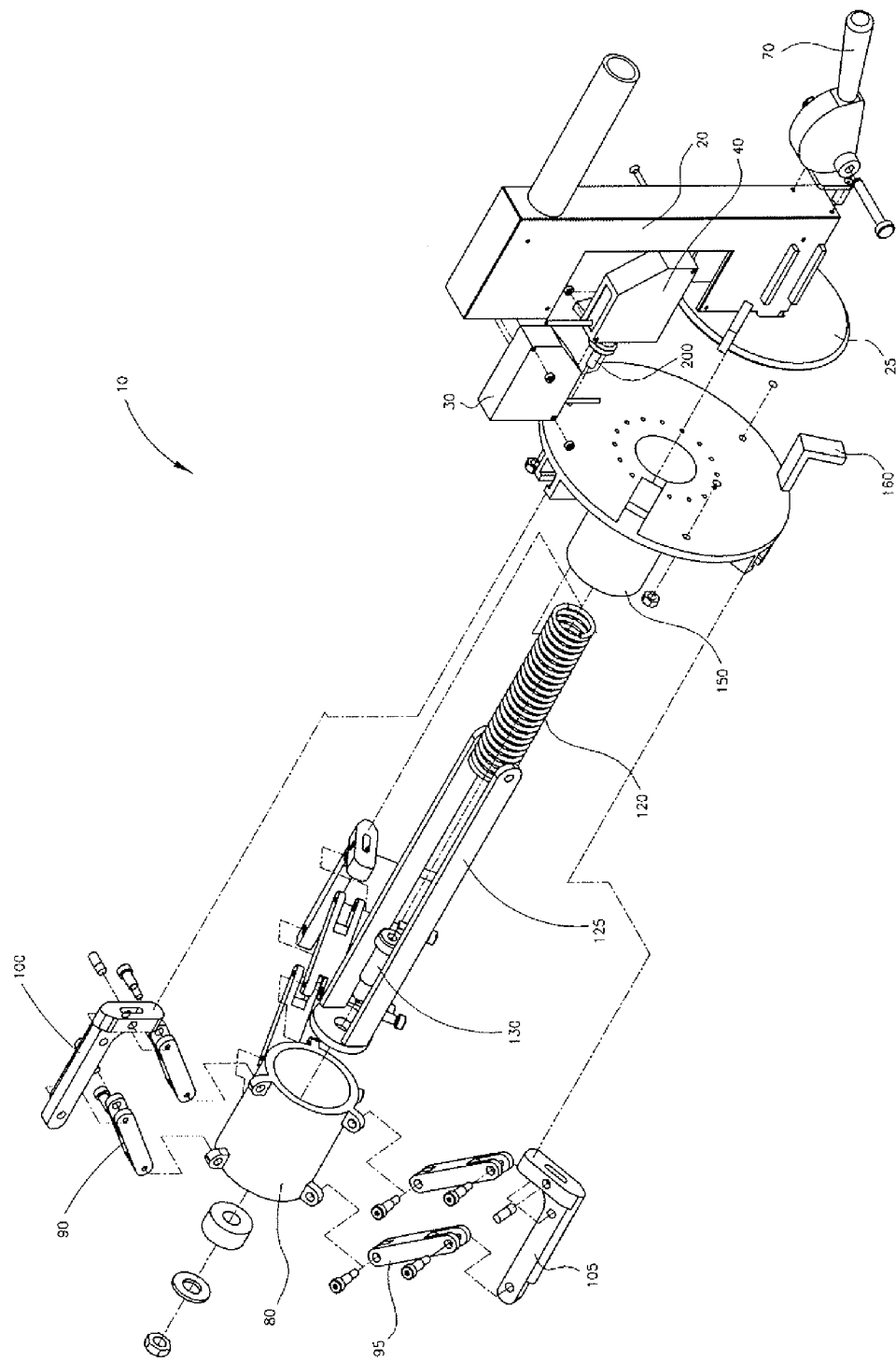
FIG. 4 is an exploded diagram of the measuring device of FIGS. 1 through 3.

FIG. 1 is a side of a preferred embodiment of measuring apparatus 10. FIG. 2 is a front view of measuring apparatus 10 shown from lines 2-2. FIG. 3 is a sectional view of measuring apparatus 10 taken along the lines A-A. FIG. 4 is an exploded diagram of measuring apparatus 10. Measuring apparatus 10 can comprise body 20, exterior measurement device 30, interior measurement device 40, and clamp 60. Alternatively, either exterior or interior measurement devices can be used by themselves. Also alternatively, clamp 60 can be omitted or another mechanism can be used to secure measuring apparatus while measurements are being taken.

Exterior and interior measurement devices 30,40 can be electronic measurement devices such as laser, sonar, or magnetic resonance measuring devices (lasers are shown in a preferred embodiment). Alternatively mechanical measuring devices can also be used.

Clamp 60 can comprise cup 80, extension 150, a plurality of arms 90, a plurality of arms 92, and a plurality of arms 95, along with plates or members 100, 102, and 105. Extension 150 can be slidingly connected to cup 80. Plates 100,102, 105 can be pivotally connected respectively to plurality of arms 90,92,95 which plurality of arms can be pivotally connected to cup 80. Plates 100,102,105 can be slidably connected to base 140. With such a construction as cup 80 is moved in the direction of arrow 180 plates 100,102,105 will move radially outward in the direction of arrows 190. As plates 100,102,105 move radially outward they can fix measuring apparatus 10 such as to the longitudinal bore 6 of a pipe 5. Moving handle 70 in the direction of arrow 170 causes cup 80 to move in the direction of arrow 180 and plates 100,102,10s to expand moving radially outward in the direction of arrows 190. This action can cause clamp 60 to lodge (friction couple) to the inside surface of bore 6 for a pipe 5. Moving handle 70 in the opposite direction of arrow 170 causes plates 100,102,105 to contract moving radially inward in the opposite direction of arrows 190. In this manner clamp 60 can be locked and unlocked. Fixing measuring apparatus will allow various measurements to be obtained by measuring devices 30,40 from a fixed position relative to pipe 5 to be measured. Spring 120 causes cup 80 to tend to slide away from extension 150 (i.e., in the opposite direction of arrow 180).

Tabs 160,165,166 attached to base 140 can be used to position measuring apparatus 10 inside longitudinal bore 6 of pipe 5 before clamp 60 is placed in a locked position.

Figure 6:
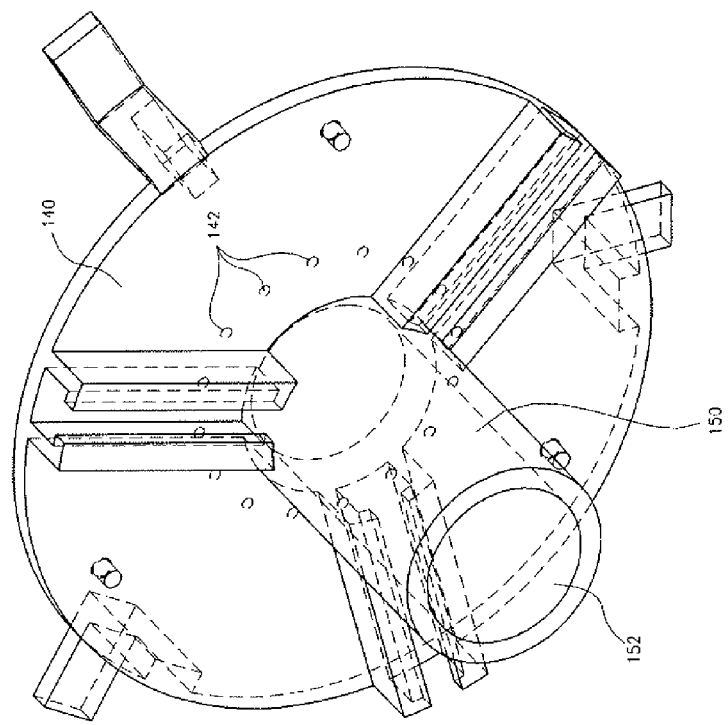
FIG. 6 is a perspective view of the base of the clamp of the measuring device of FIGS. 1 through 3.
Figure 5:
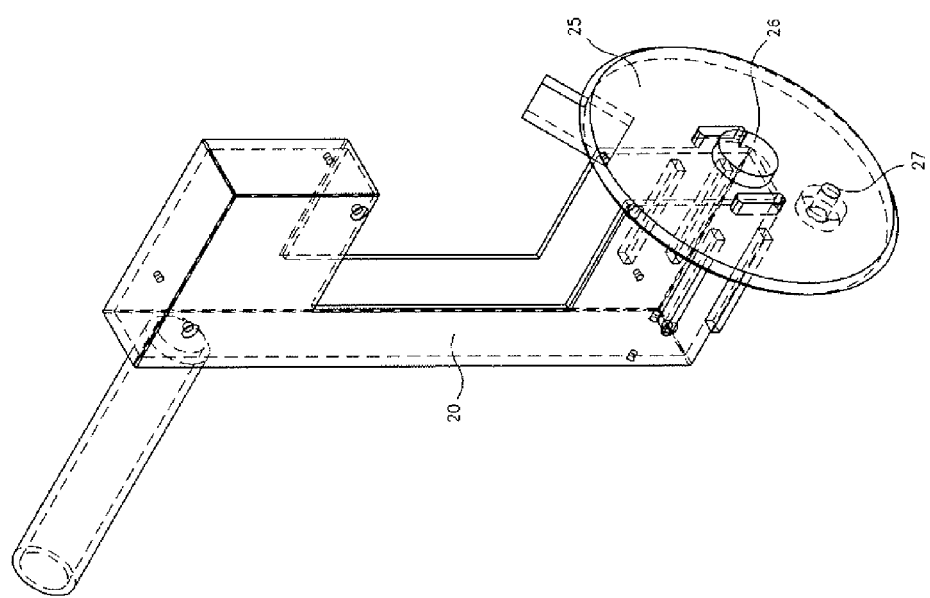
FIG. 5 is a perspective view of the body of the measuring device of FIGS. 1 through 3.

Body 20 can be rotatably connected to clamp 60 allowing various measurements to be taken on a pipe 5 after clamp 60 has been locked to interior bore 6 of pipe 5. FIGS. 5 and 6 show one method of rotatably connecting body 20 to clamp 60. Body 20 can comprise circular base 25 and shaft 26. Shaft 26 rotatably connects extension 150 of clamp 60's base 140 through bore 152. A plurality of rollers 143 (shown in FIG. 1) can be used to rotatably affix base 25 to base 140. Relative angular positions between body 20 and clamp 60 can be determined by a plurality of openings 142 on base 140. Biased arm 27 (such as a spring-loaded ball bearing) on body 20 can be configured to enter openings 142 (by clicking into place) as body 20 is rotated relative to clamp 60. In this manner a ratcheting effect can be achieved between body 20 and clamp 60. The relative angular position of each opening 142 controls the relative angular position of body 20 to clamp 60 when a ratcheting effect is felt by a person rotating body 20. In a preferred embodiment sixteen openings 142 are radially spaced about base 140. In this manner a ratchet effect will be felt every 22.5 degrees of relative rotation between body 20 and clamp 140. In alternative embodiments various numbers of openings 142 can be used either uniformly spaced or non-uniformly spaced.

Figure 7:
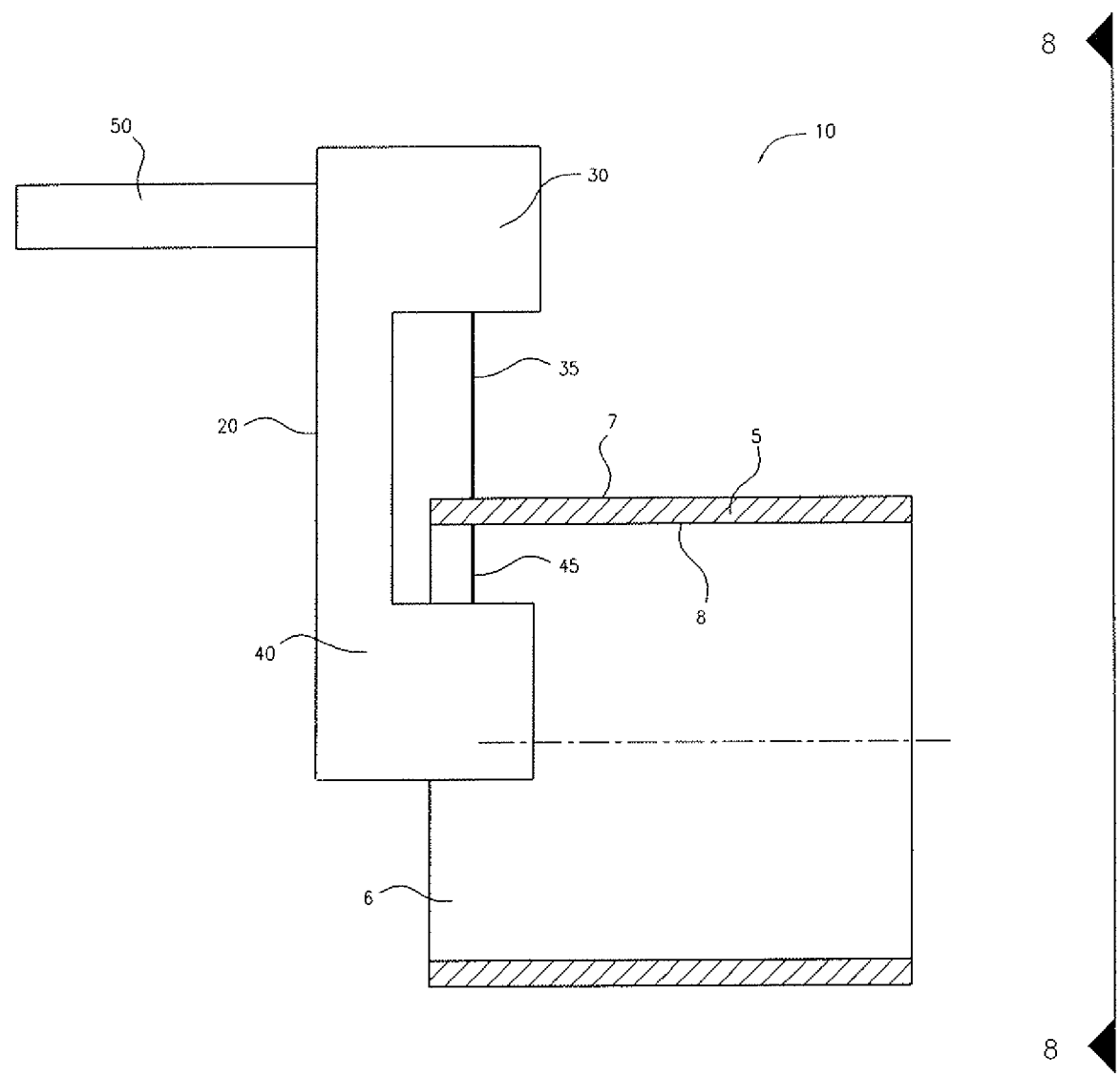
FIG. 7 is a schematic view of a measuring device in a position to take a measurement on a pipe.

FIG. 7 is a schematic view of measuring apparatus 10 taking a measurement on pipe 5. For purposes of clarity only body 20 is shown. Measuring device 30 can be a laser, shooting laser beam 35 which bounces off exterior surface 7 of pipe 5.

Figure 8:
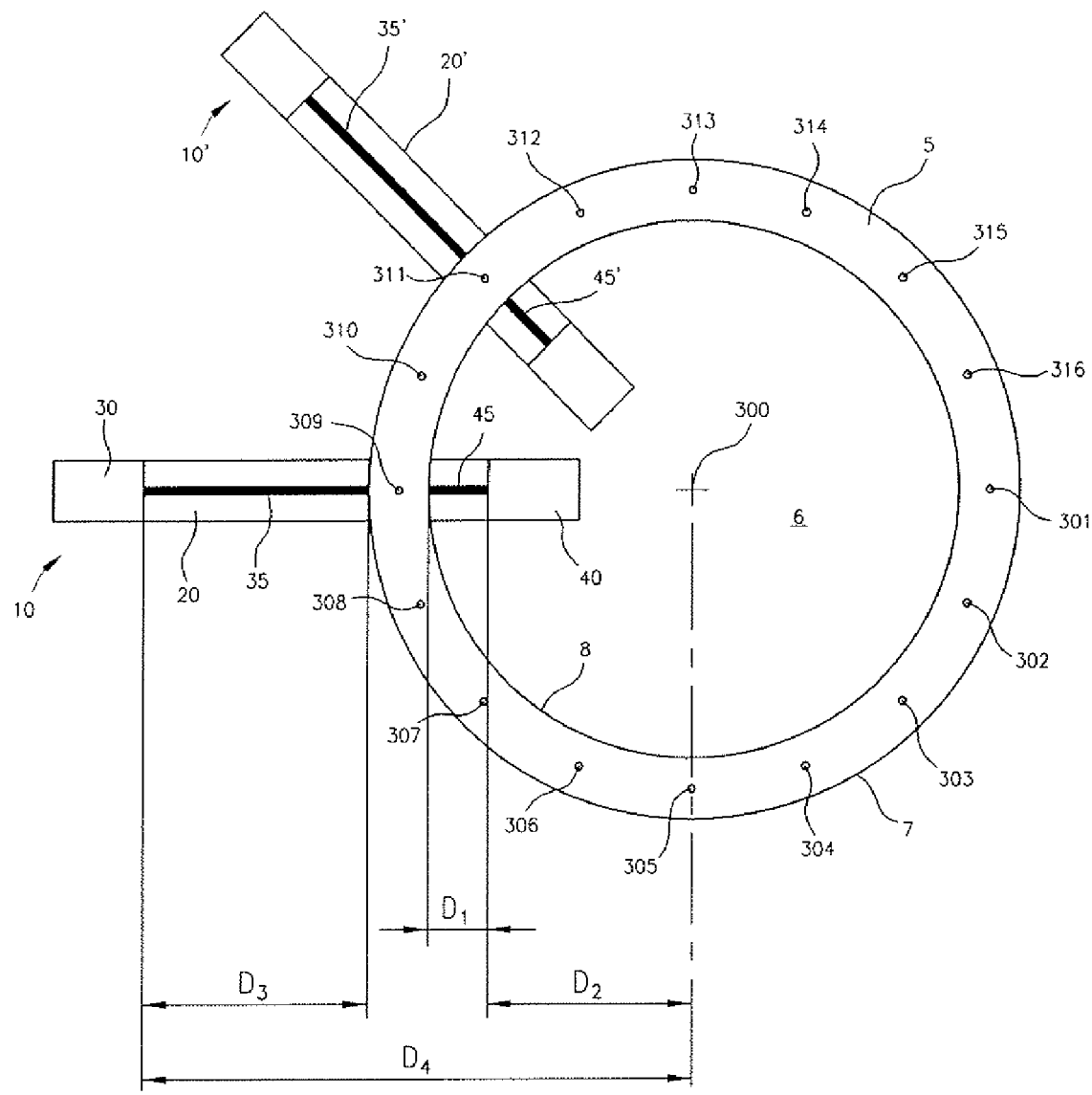
FIG. 8 is a schematic view showing various measurements taken on a pipe.

Measuring device 40 can be a laser shooting laser beam 45 which bounces off interior surface 8 of pipe 5. FIG. 8 is a schematic view of the measuring apparatus 10 from the lines 8-8 of FIG. 7 and schematically two measurements taken on pipe 5. Shown in FIG. 8 are a plurality of measurement points 301 through 316 which would correspond to the positions of body 20 when it ratchets into one of the plurality of openings 142. Pivot point 300 schematically illustrates the point of rotation of body 20 relative to clamp 60 (although clamp 60 is not shown for purposes of clarity). Body 20 schematically illustrates measuring apparatus 10 in a first position. Body 20' schematically illustrates measuring apparatus 10' in a second position (after measuring apparatus 10 has been rotated relative to the first position). In the first position (measurement position 309) laser beam 45 provides the distance between laser 40 and the interior surface 8—which is labeled as D1. D2 is a known distance from the axis of rotation between clamp 60 and body 20. The total distance between the axis of rotation 300 and interior surface 8 (at measurement location 309) is D1 plus D2. In the first position (measurement position 309) laser beam 35 provides the distance between laser 30 and the exterior surface 7—which is labeled as D3. D4 is a known distance from the axis of rotation 300 between clamp 60 and body 20. The total distance between the axis of rotation 300 and exterior surface 7 (at measurement location 309) is D4 minus D3. In this manner the distances from the axis of rotation 300 to the interior 8 and exterior 7 surfaces can be determined for positions 301 through 316. Body 20' schematically illustrates measuring apparatus 10' at measurement position 311. Taking measurements at locations 301 through 316 provides sixteen measurements to internal surface 8 and sixteen measurements to external surface 7. This data can be stored in a database for later comparison.

Figure 9B:
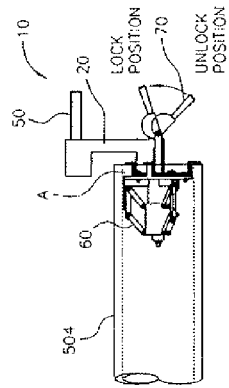
FIG. 9B is a perspective view of a measurement device installed in the end of a pipe to be measured.
Figure 9A:
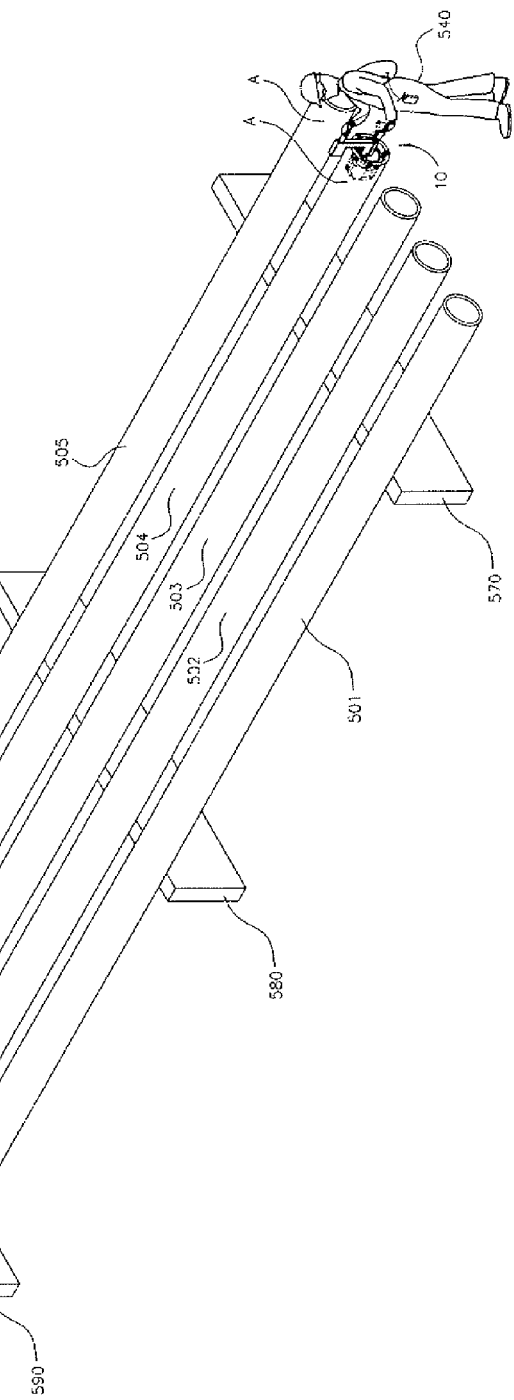
FIG. 9A is a perspective view of various pipes to be measured and an individual taking measurements on one pipe end.

FIG. 9A is a perspective view of a person using measurement apparatus 10 on side A of pipe 504. Pipes 501, 502, 503, 504, and 505 are shown being held by supports 570, 580, and 590. FIG. 9B is a side view showing measurement apparatus taking a reading at end A of pipe 504. The locked and unlocked position of handle 70 is schematically shown. FIGS. 10A and 10B are a closeup of the pipes and measurement apparatus 10 shown in FIG. 9A. Handle 70 is shown locking clamp 60 to the interior bore of pipe 504.

Operator 540 is shown positioning body 20 by handle 50 to take a measurement with lasers 30, 40. Operator 540 can cause lasers 30, 40 to take measurements through operation of a control unit 550. Back pack 560 can house a power pack and electronic components which allow control unit 550 to operate and receive information from lasers 30,40. Some or all of these components can be mounted on/incorporated into measurement apparatus 10. Lasers 30,40 can be commercially available items or within the knowledge of those skilled in the art. The power pack and electronic components and control unit can be those which are commercially available and within the knowledge of those skilled in the art.

In an alternative embodiment a commercially available scanner 600 can be included to allow operator 540 to electronically scan indicia which identify end A of pipe 504. This scanner can even be combined with control unit 550. Alternatively, such identifying information can be manually input by operator 540 into control unit 550 or readings can be otherwise recorded such as being handwritten on paper.

Figure 11B:
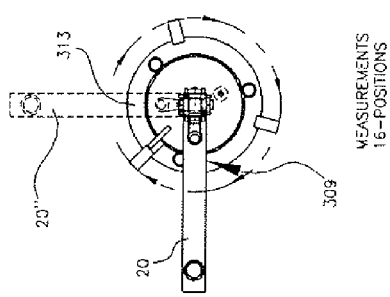
FIG. 11B is a side view of the measuring apparatus in FIG. 11A.
Figure 11A:
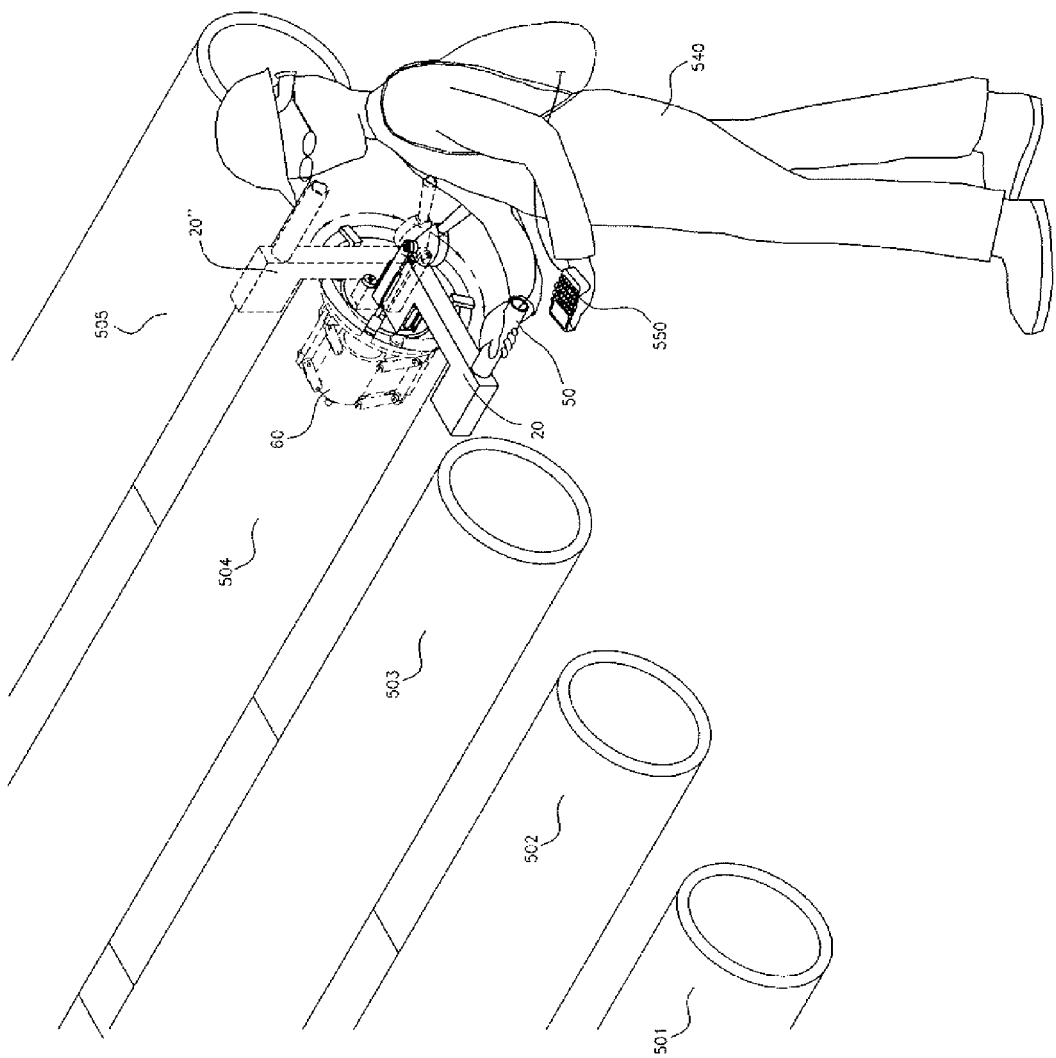
FIG. 11A is a perspective view of various measurements being taken on a pipe with a measuring apparatus.

FIGS. 11A and 11B illustrate two readings being taken by measurement apparatus 10 on end A of pipe 504. Measurement apparatus 10 has been secured on end A of pipe 504 by clamp 60. The first reading is shown by body 20 and can correspond to measurement point 301 in FIG. 8. After the measurement data has been taken at point 301 various additional measurements for end A of pipe 504 can be taken, such as the measurements at the position indicated by body 20". Operator 540 can move body 20 to various positions by handle 50. In this manner measurements can be taken at end A of pipe 504 at each point of interest (i.e., for which data is desired). At each position operator 540 can use control unit 550 to operate and receive information from lasers 30,40. After data is acquired from each one of the desired measurement positions, operator can move onto the next pipe end for which to take measurements. This next set of measurements can be taken at end B of pipe 504 (assuming end B was not already completed). Alternatively, operator 540 can take measurements on another pipe, such as end A of pipe 505, but the measurement data should be indexed to the specific pipe on which measurements are being taken. Alternatively, measurements can be indexed to the specific end of the specific pipe. Where the measurement data can be properly indexed, completing measurements for all ends A of pipes 501 through 505 before taking measurements for all ends B of pipes 501 through 505 may be more efficient because operator 540 will not have to move from end to opposite end for each measurement. Looking at FIG. 9A indicates that walking from end to end during each set of measurements can be a long process.

Figure 12:
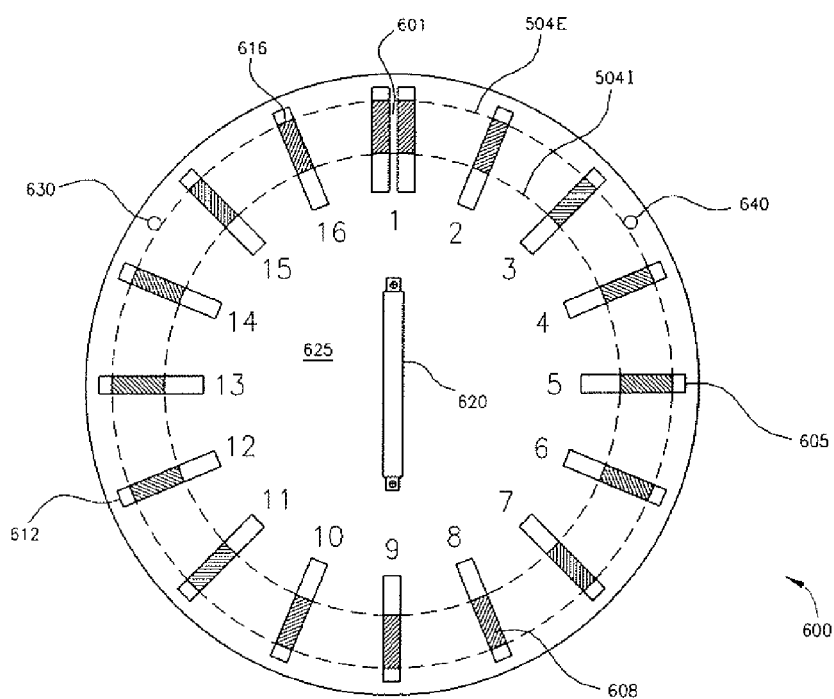
FIG. 12 is a schematic diagram of a marking template.
Figure 13:
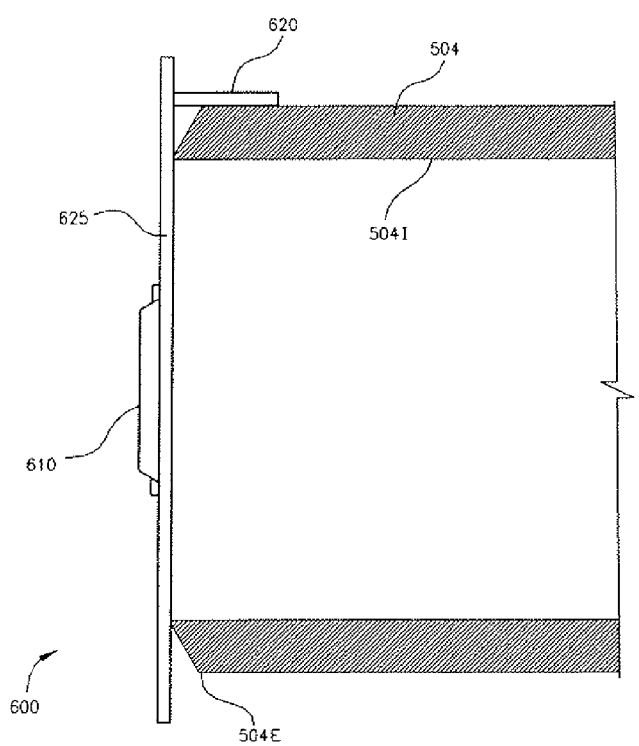
FIG. 13 is a sectional view of the marking template of FIG. 12 installed on the end of a pipe to be measured.

FIG. 12 shows a marking template 600 for marking the ends of pipes at various positions for which measurements can be or have been taken. These marks can later be used when assembling the pipes to other pipes which have been determined to be a good fit through application of a best fit algorithm. Template 600 can comprise plate 625, handle 620, and pins 630,640. As shown in FIGS. 12 and 13 template 600 can be supported on pipe 504 by pins 630,640. Various alternative systems exist for supporting template 60 such as hand held, adhesive, magnets, etc. Marking template 600 can be combined or integral with measurement apparatus 10.

Template 600 can include sixteen marking locations as shown by openings 601 through 616. Alternatively, template 600 can include more or less than sixteen openings depending on the number of data points to be taken by measurement apparatus 10. Openings 601 through 616 are shown as slots for which marks can be spray painted onto the end of a pipe. However, many different methods of marking exist such as die stamps, etching, stickers, electronic, and other methods or combinations of these methods to identify the various positions of interest. Openings 601 through 616 correspond to measurement points 301 through 316 (taken by measurement apparatus 10) and schematically shown in FIG. 8.

Opening 601 includes two slots to identify this as the starting reference, however, numerous other ways exist to identify a starting reference point. For example, opening 601 if a single slot can be painted a different color or opening 601 can be a different shape than the other slots. Positions 602 through 616 can be determined by maintaining a convention that positions are counted in a clockwise direction from starting reference 601. Alternatively, a counterclockwise convention can be used.

Figure 15:
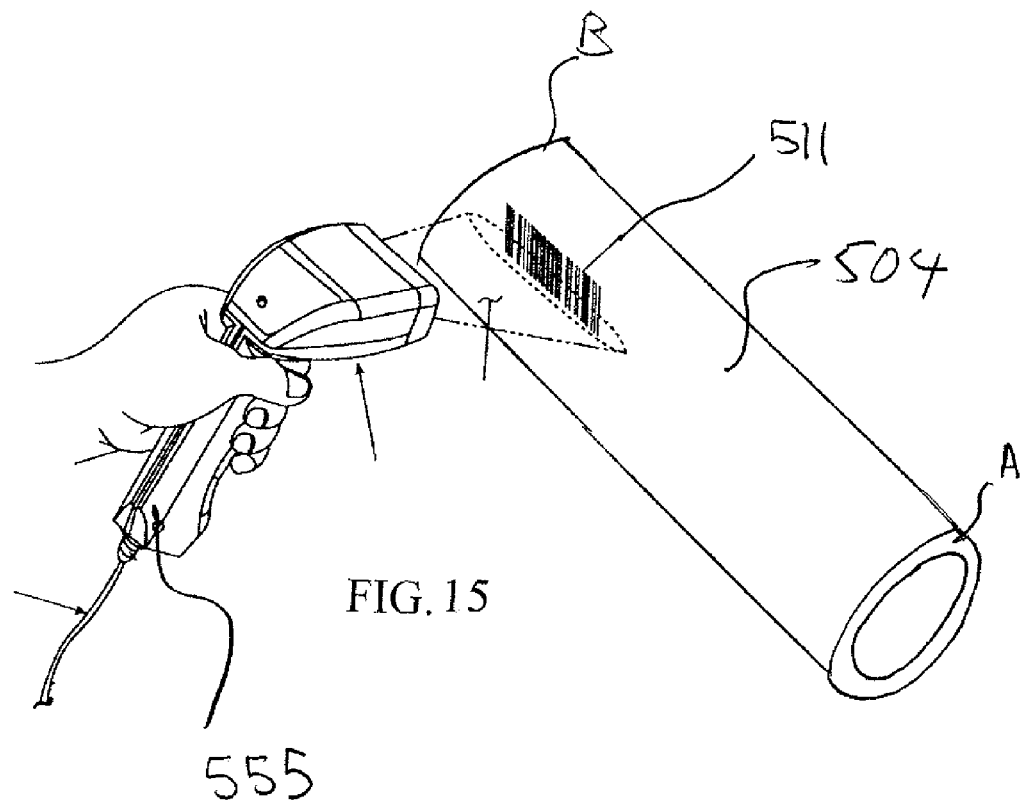
FIG. 15 is a perspective view of a pipe to be measured having a bar code as identifying indicia and showing a scanner scanning the bar code indicia.
Figure 14:
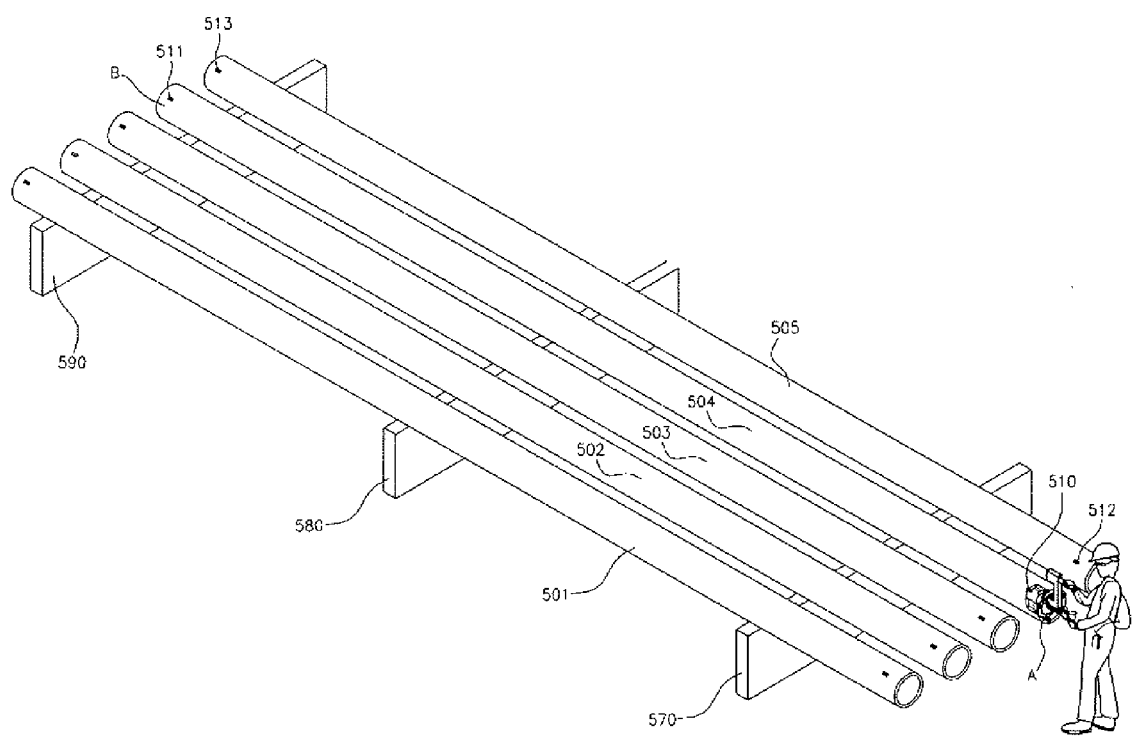
FIG. 14 is a perspective view of various pipes to be measured having indicia identifying the ends of each pipe.
Figure 16:
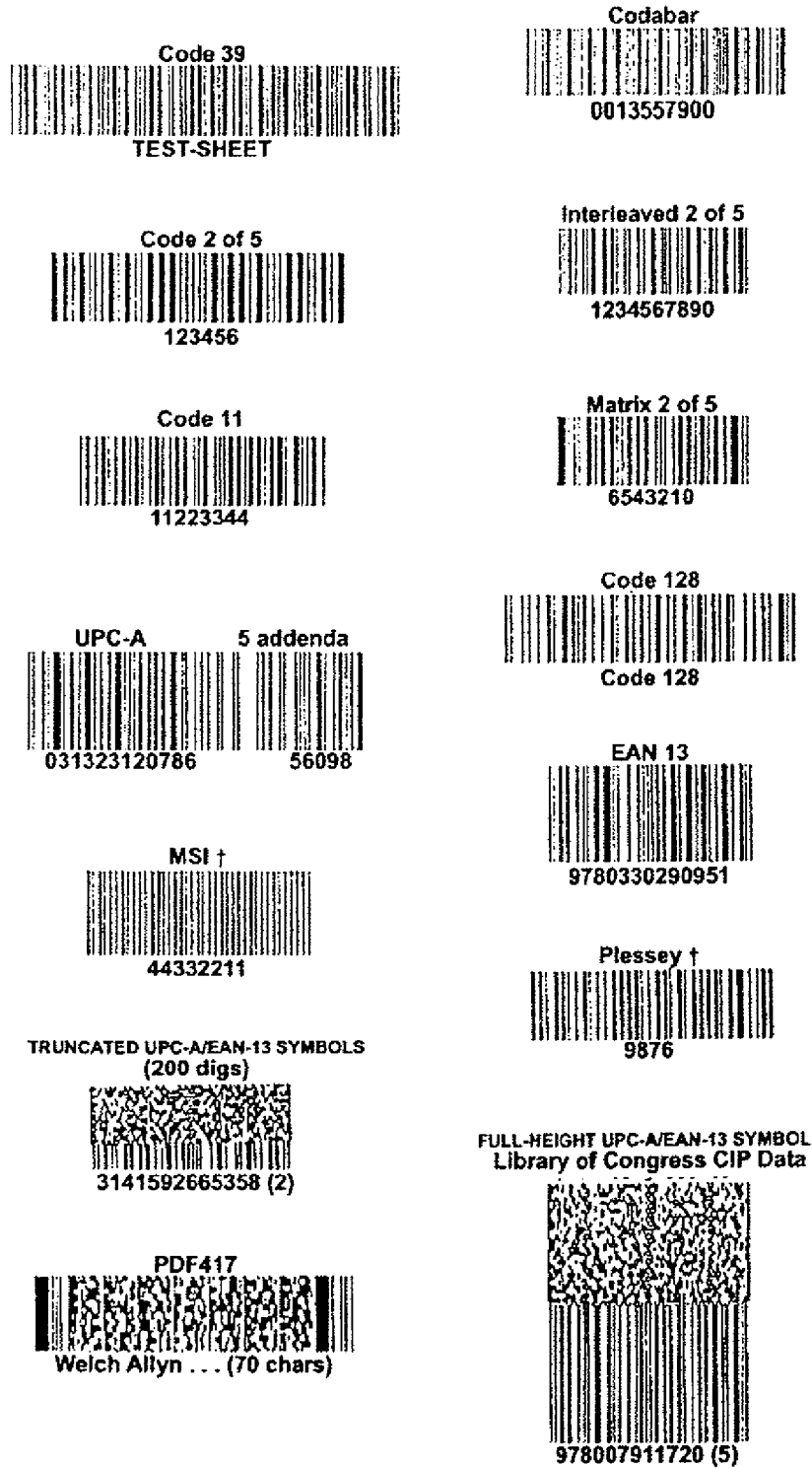
FIG. 16 shows various types of bar code indicia which can be used to incorporate identifying indicia.

FIG. 14 is a perspective view of pipes 501 through 505 to be measured. In this embodiment identifying indicia have been placed on the pipes. For example on pipe 504 indicia 510 has been placed on end A and indicia 511 has been placed on end B. Similarly on pipe 505 ends A and B indicia 512 and 513 have been placed. The various indicia can be used to specifically identify the particular end of the particular pipe to be measured. Alternatively, indicia on only a single end of each pipe can be used. The indicia can be any identifying mechanism such as a manual stenciled number. Preferably an indicia format will be used which can be electronically identified to eliminate human error in identifying the particular end of a particular pipe. One electronic format is a bar code identifying system as shown in FIG. 15. Various bar code formats are shown in FIG. 16. Any format can be used which will allow identification of each end of each pipe. For example the pipes can be numbered from 1 through the total number of pipes being measured for fitting. The bar codes can be generated before any measurements are taken and each pipe labeled with a bar code indicia. Operator 540 when taking the measurement with measuring apparatus 10 could scan the bar code which could allow automatic indexing of any measurement data taken by measurement apparatus 10. The indicia are shown on the outside of the pipes in FIGS. 14 and 15 but could also be locate on the ends, inside bore of the pipes, or any other location as long as access to the information can be obtained. The indicia can be applied to the pipes before measurements are taken or can be applied during the measurement process. For example, operator 540 can be supplied with a bar code generator and printer which can be used to generate printed bar codes and applied before or after measurements are taken for a particular pipe end. Other electronic identification formats can include radio frequency identifiers and optical scanners. Stencils and imprints can be used as identifiers.

FIG. 15 is a perspective view of a pipe 504 to be measured showing a scanner 555 scanning an indicia 511 on pipe 504. FIG. 16 shows various types of bar code indicia which can be used.

For a universe 500 of pipes 501, 502, 503, etc. measurements can be taken on each end of each pipe in the universe 500. In one embodiment, on each side of each pipe, thirty two data pieces can be stored (sixteen related to the interior surface and sixteen related to the exterior surface). Because each pipe has two sides for a total of sixty four data pieces. The data for all pipes can be stored in a database for comparison. Preferably, in the database the data pieces can be indexed by pipe identifier (e.g., pipes 501, 502, 503, etc.), pipe end identifier (e.g., end A or end B), and exterior and interior surfaces for each measurement location 301, 302, through 316. In other embodiments more or less data pieces than 32 can be taken for each pipe end.

Various analyses can be performed to determine proper selection of pipes 501,502,503, etc. These analyses include, but are not limited to a tolerance check and a best fit analysis.

A tolerance check can be performed on each pipe. The measurements for each pipe in the universe 500 can be checked to ensure that such measurements do not fall outside of a user's defined criteria. For example, one criteria may be that no measurement for the interior can be more than a set tolerance from a stated measurement (e.g, no more than 0.5 millimeters from 15 centimeters). A similar type of criteria may be set for the measurements to the exterior (e.g, no more than 0.5 millimeters from 17.5 centimeters). Additionally, a similar criteria can be set for the difference between the interior and exterior measurements (e.g., no more than 0.5 millimeters from 2.5 centimeters). If the measurements for one or more pipes fall outside of the defined criteria, these pipes can be rejected or refurbished such as by machining.

For each pipe remaining after the tolerance check, a best fit analysis can be performed. For a universe 500 of pipes 501, 502, 503, etc. a best fit can be determined by comparing the data pieces for one pipe 501 end (e.g, end A) to the measurements of those pipe ends (ends A and B) for the remaining pipes 502, 503, etc. to determine which pipe end most closely fits that of pipe 501. For example, end A of pipe 501 might be determined to most closely fit end B of pipe 507. After determining this fit, then the other end of pipe 507 (i.e., end A) can be compared for best fit to both ends of the pipes remaining in universe 500 (i.e., pipes 502, 503, 504, 505, 506, 508, 509, etc.). This process can be continued until each pipe end has been matched to another pipe end or possibly rejected as a non-matching based on an algorithm determining whether to pipes ends are a match (such as a maximum on the sum of the difference of the squares).

In an alternative embodiment, instead of using a serial determination of best fit (i.e., best fit for one pipe end to each possible pipe end), an exhaustive statistical analysis can be performed for each possible combination of the pipe ends in the universe of pipes. Once the database of data is set up the best fit calculation would not take much additional time to the serial calculation if a computer was used to perform the calculation. However, the amount of calculations would be increased by an order of magnitude for the same amount of data pieces when compared to calculating best mode in a serial fashion.

Various options exist for what measurements can be used in determining a best fit. These include: (a) measurement to the inside surface of the pipe; (b) measurement to the exterior surface of the pipe; (c) some combination of the interior and exterior measurements; (d) wall thickness comparisons; and (e) some combination of any of the above. It is preferred to use the interior measurement.

Various algorithms exist for determining a best fit between a universe of data sets, such as measurement data sets. One algorithm can be the sum of the squares of the differences between measurements for two pipe ends. Other algorithms can be the sum of the differences to the fourth power or any other even power. Even powers are preferred because odd powers could allow large negative differences to offset positive differences. Alternatively, the sum of the absolute value of the differences could be compared where odd powers were used. The ultimate service or use of the items to be fit may determine a best fit algorithm which is used.

After the best fit analysis has been determined each pipe from the universe of pipe can be set for connection to another pipe from universe 500. A report can be prepared setting forth the sequence and orientation of pipes to be joined (and to which end). The pipes can be listed in the report by their identification, which may be the bar code indicia. At this point the pipes can be joined as specified in the reported sequence. Various methods of ensuring proper sequences in the field can be used. One method includes, after the pipes have been laid in a line for joining, an operator 540 comparing individual pipe identifying indicia to the sequence listed in the report. Where the indicia can be electronically read, such as through bar codes, operator 540 can use a scanner to read each indicia on each pipe in the order in which the pipe is laid out. This order will be compared to the order listed in the sequencing report and if not matching a warning signal can be issued. A report can also be generated showing what is not connect. Operator 540 could have the option to manually override the warning signal. In an alternative embodiment, a warning signal could be generated after the first non-matching pair of indicia is determined. In another alternative embodiment the identifying indicia can be read when each pipe is pulled from the rack and a warning signal issued if a non-matching indicia is found. However, this embodiment suffers from the risk that the pipe will be flipped around (longitudinally) when placed in a line for joining. In another alternative embodiment the pipe indicia can be read when taken off the rack and then read again after being placed in a line for joining.

Depending on the size and storage of a universe 500 of pipe to be best fit, a best fit analysis may be done to various subsets (or batches) of the universe 500. For example the number of pipes to be joined may be so numerous that they are stored on different racks and when pulled from storage it will be difficult and inefficient to pull pipes from one rack to another for obtaining a best fit. In this situation subset best fit analyses can be performed on each individual batch. For example, a best fit analysis can be performed for each pipe on a particular rack. Then a joining sequence for these pipes can be identified from this subset best fit analysis. Another best fit analysis can be performed for all the pipes on a second rack and a joining sequence developed for these pipes for the second rack. The subsets do not have to be limited to racks but can be defined by the operator based on the operator's own requirements. For example, where the pipes are to be shipped via cargo ships, pipes stored in one section of the cargo ship can be separately best fit and sequenced from pipes stored in another section. Another example includes where groups of pipe are shipped separately. Each separate shipment can be separately best fit and sequenced. Similarly with rail transportation, separate cars of pipes can be separately best fit and sequenced.

In an alternative embodiment, a replacement best fit algorithm can be used to address the situation where a pipe 504 which has already been best fit and sequenced is damaged or somehow prevented from being used. At this point there is a gap in the sequence of pipes which must be filled. One way to fill this gap (replace pipe 504) is to have a universe 800 of replacement pipes which can be used to replace sequenced pipes which can no longer be used. At this point there are two pipe ends which must be best fit—those ends which were to be joined to either side of pipe 504. The measurement data for these two pipes and the pipes in universe 800 could have already been taken. If so, then a best fit analysis can be performed using the data already obtained. Similar best fit algorithms to those discussed above can be used. The difference would be to seek the best for both ends and this cannot be done sequentially as described above. Instead, the calculations (e.g., such of the squares of the differences) can be summed for both connections and the pipe in universe 800 having the best analysis can be selected. In an alternative embodiment, measuring apparatus 10 can be used to measuring the pipe ends in the gap created by damaged pipe 504 along with the pipes in universe 800 to obtain the data and a best fit analysis done to pick the pipe from universe 800 which best fits this gap. Alternatively, or a check can be performed to determine if the joint ends for the two pipe end sequenced before and after the removed pipe match. Of course, an overall best fit analysis for the entire string can be done which analysis incorporates the remaining pipes in the string in which damaged pipe 504 had been sequenced and the universe 800. One disadvantage in doing this overall best fit analysis is that the already sequenced pipes may be reordered differently necessitating the time and effort to reposition many or all of the pipes.

Figure 20A:
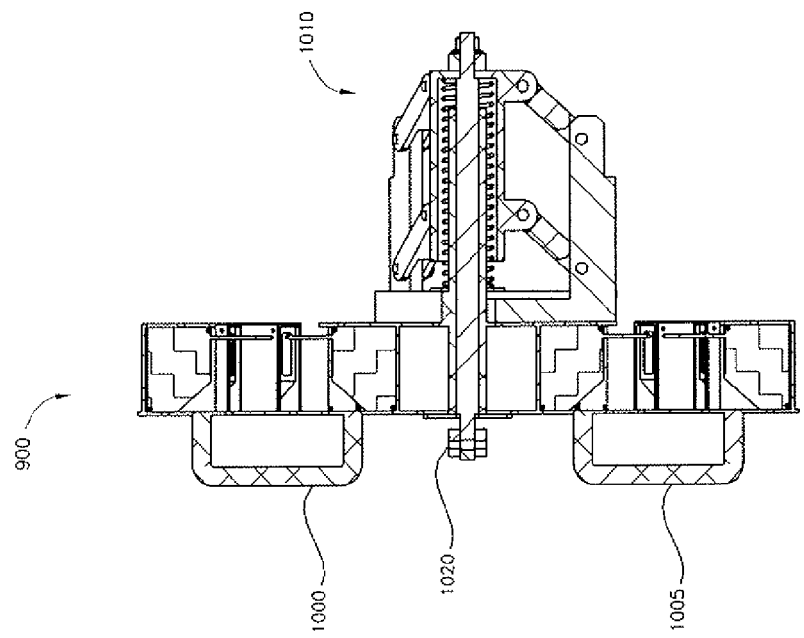
FIG. 20A is a sectional view taken along the lines A-A of FIG. 20.
Figure 17:
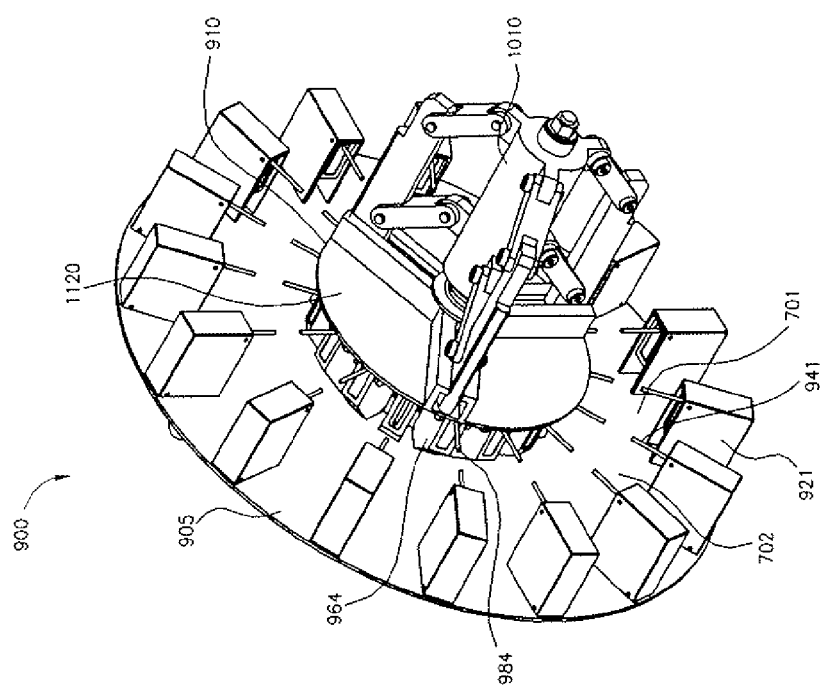
FIG. 17 is a perspective view of an alternative embodiment of a measuring apparatus having multiple measuring devices.
Figure 20:
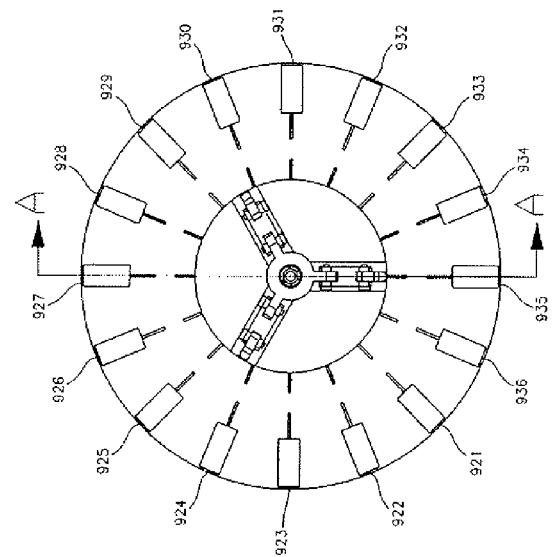
FIG. 20 is a front view of the measuring apparatus of FIG. 17.
Figure 19:
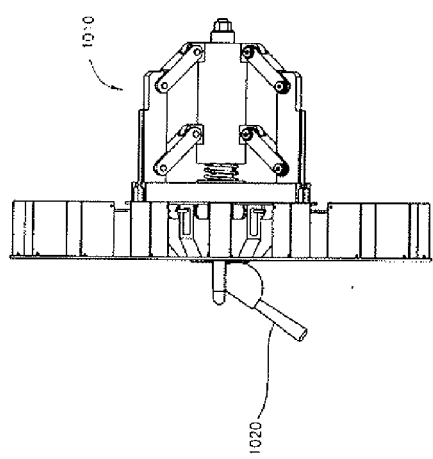
FIG. 19 is another side view of the measuring apparatus of FIG. 17 but rotated ninety degrees.
Figure 18:
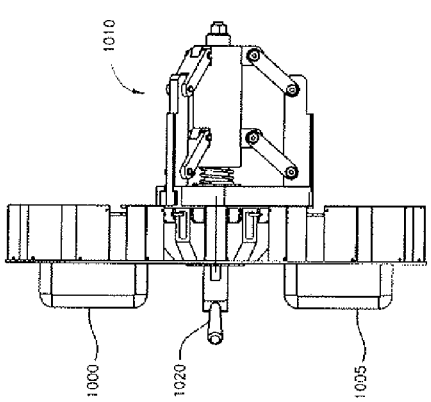
FIG. 18 is a side view of the measuring apparatus of FIG. 17.
Figure 21:
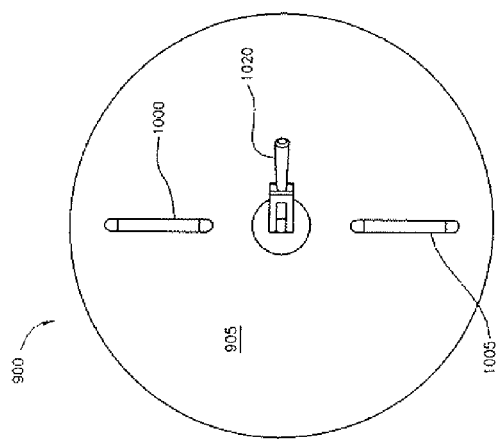
FIG. 21 is a rear view of the measuring apparatus of FIG. 17.
Figure 22:
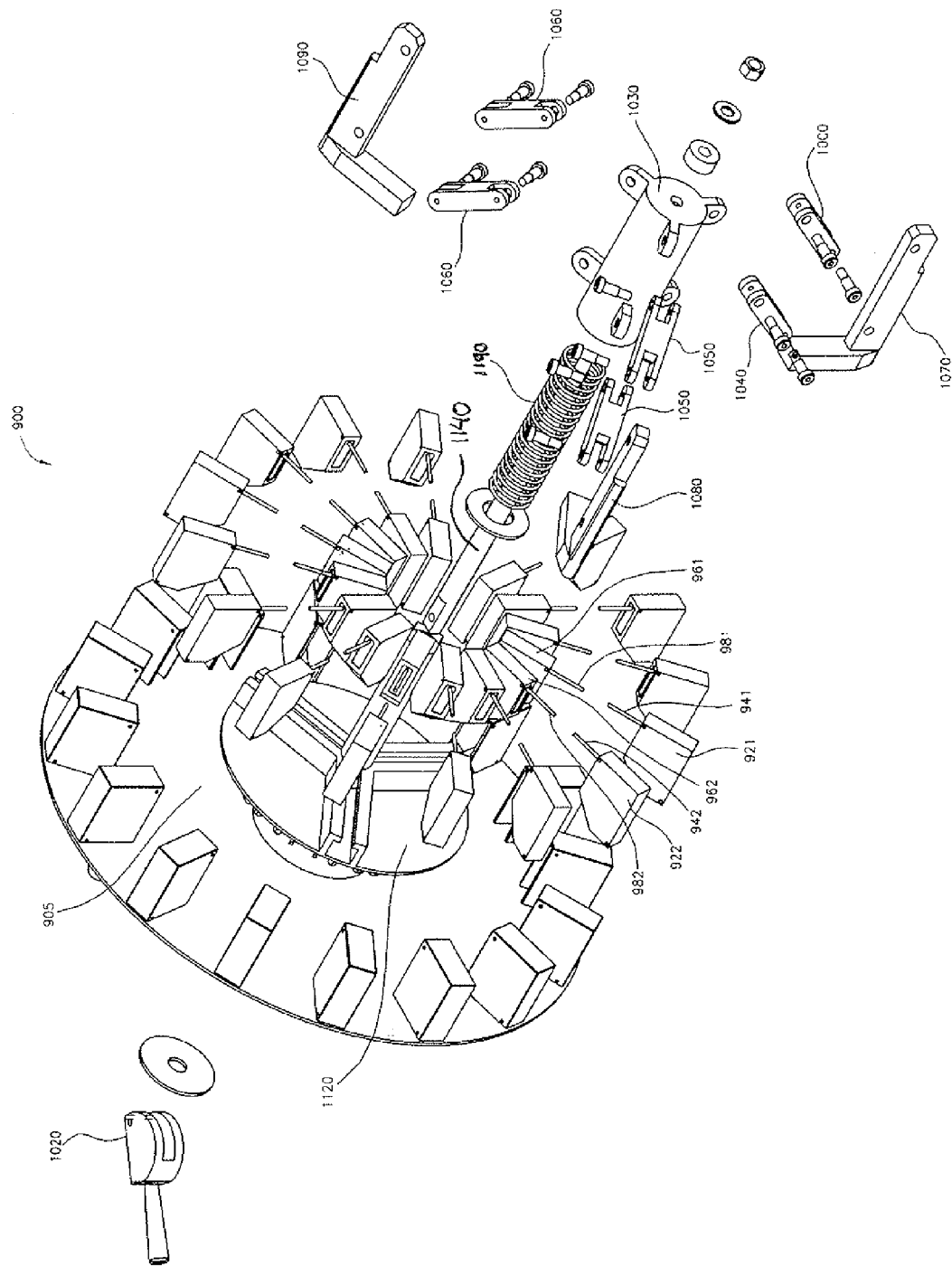
FIG. 22 is an exploded diagram of the measuring apparatus of FIG. 17.

In an alternative embodiment shown in FIGS. 17 through 22, measuring apparatus 900 can include a first set of measuring devices 961 through 976 at positions 701 through 716. A second set of measuring devices 921 through 936 can also be included at positions 701 through 716. The first set of measuring devices 961 through 976 can measure distance from each measuring device to the inside diameter of a pipe to be measured. The second set of measuring devices 921 through 936 can measure the distance from each measuring device to the external diameter of the pipe to be measured. The first and second sets of measuring devices 961-976 and 921-936 can be lasers. Using a set of measuring devices allows measuring apparatus 900 to be static during in taking a set of measurements on the pipe to be measured. No longer will measuring apparatus 900 have to be rotated from one measurement position to another. However, measuring apparatus 900 can perform all the measurements and subsequent analyses as described in this application. A current disadvantage of this alternative embodiment is the cost of multiple measuring devices 961-976 and 921-936. An advantage of this embodiment is minimizing the number of moving parts and the ability to take faster measurements. Another advantage of this embodiment is the removal of human error in identifying individual measurements for a particular pipe end. FIG. 17 is a perspective view of measuring apparatus 900. FIG. 18 is a side view of measuring apparatus 900. FIG. 19 is another side view measuring apparatus 900 but rotated ninety degrees. FIG. 20 is a front view of measuring apparatus 900. FIG. 20A is a sectional view taken along the lines A-A of FIG. 20. FIG. 21 is a rear view of measuring apparatus 900. FIG. 22 is an exploded diagram of measuring apparatus 900.

Clamp 1010 can be constructed similar to clamp 60. It can comprise cup 1030, rod 1140, a plurality of arms 1040, a plurality of arms 1050, and a plurality of arms 1060, along with plates or members 1070, 1080, and 1090. Rod 1140 can be operatively connected to cup 1030. Plates 1070,1080, 1090 can be pivotally connected respectively to plurality of arms 1040,1050,1060 which plurality of arms can be pivotally connected to cup 1030. Plates 1070,1080,1090 can be slidably connected to base 1120. With such a construction as cup 1030 is moved plates 1070,1080,1090 will move radially inward and outward. Moving handle 1020 causes cup 1030 to move. This action can cause clamp 110 to lodge (friction couple) to the inside surface of bore 6 for a pipe 5. Fixing measuring apparatus will allow various measurements to be obtained by measuring devices 961-976 and 921-936 from a fixed position relative to pipe 5 to be measured. Spring 1140 causes cup 1030 to tend to be pushed away from base 1120.

In one embodiment the measurement apparatus 10 can be calibrated by using a calibrating standard 700 of known measurements. Automatic calibration can be achieved by having controller 550 compare one or more measurements taken by measurement apparatus 10 (by measurement devices 30,40) to known measurements and automatically adjusting any future measurements by discrepancies. In one embodiment a statistical analysis can be done on the measurements taken if non-uniform discrepancies are found when measuring standard 700. In one embodiment a warning signal is issued where non-uniform discrepancies are found when measuring standard 700.

Figure 23:
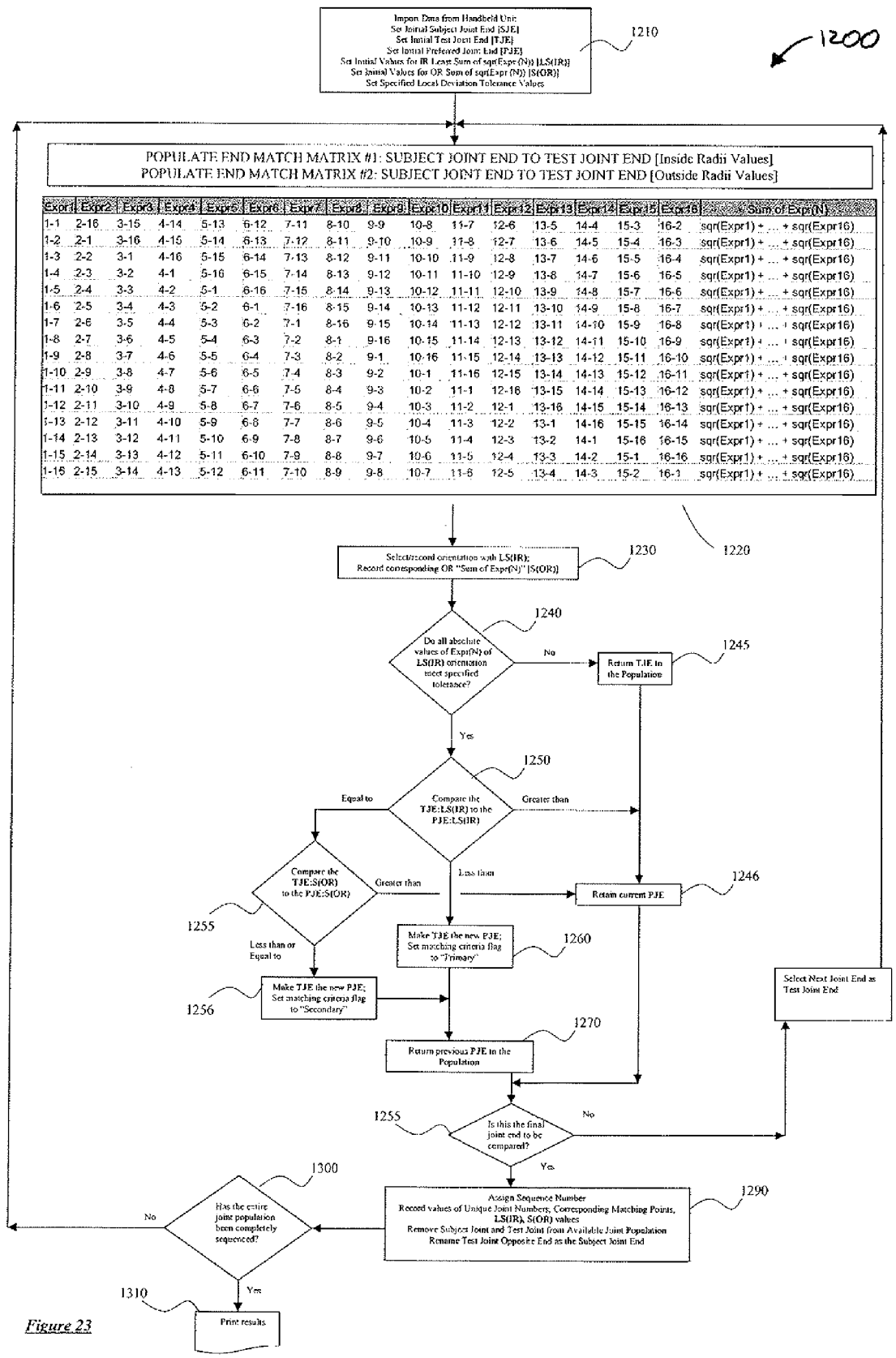
FIG. 23 is a flow chart schematically illustrating one embodiment of measuring and performing a best fit analysis on a universe of pipes.

FIG. 23 is a flow chart schematically illustrating one embodiment of performing a best fit analysis 1200 on a universe of pipes 500. For each joint of pipe in the universe of pipes 500 various measurements for the interior and/or exterior radii of the pipes had been recorded. For example, sixteen measurements at each end for both the internal and external radii for each pipe in the universe 500 can have been recorded. Best fit analysis 1200 attempts to select the sequencing of the pipes in the universe of pipes 500 which best fit each other. Below is described a preferred way of performing a best fit analysis 1200. Some of the abbreviations included in FIG. 23 are listed below:

SJE=Subject Joint End.

TJE=Test Joint End.

PJE=Preferred Joint End (current Joint End with the lowest "Sum of EXPR(N)" value.

LS(IR) Lowest Sum of EXPR(N) using the Inside Radii values.

S(OR)=Sum of EXPR(N) using the Outside Radii values at the orientation corresponding to LS(IR).

TJE:LS(IR)=Test Joint End Lowest Sum of EXPR(N) using the Inside Radii.

PJE:LS(IR)=Preferred Joint End Lowest Sum of EXPR (N) using the Inside Radii.

TJE:S(OR)=Test Joint End Sum of EXPR(N) using the Outside Radii values at the orientation corresponding to LS(IR).

PJE:S(OR)=Preferred Joint End Sum of EXPR(N) using the Outside Radii values at the orientation corresponding to LS(IR).

In step 1210 data obtained from measurement apparatus 10 is pulled from a database where such data had been stored. An end A and a pipe 504 from the universe of pipes 500 are selected as the initial subject joint end. This selected end is to be compared for best fit to every other end in the universe of pipes 500. The pipe ends of which the selected pipe are being compared are called the test joint ends— because these ends are being tested for proper fit to the subject joint end. Because a comparison will be made between each pipe end in universe of pipes 500 the first selected pipe end to be tested against the subject joint end can be set as the initially preferred joint end for joining to the subject joint end. After a comparison with other joint ends in the pipes from universe of pipes 500 this initially preferred joint end may be replaced by another joint end which would become the new preferred joint end. For example, an end A and pipe 505 from the universe of pipes 500 can selected as the initial test joint end. End A of pipe 504 can include sixteen measurements for the inside radius and sixteen measurements for the external radius—each of these pairs of internal and external measurements corresponding to one of sixteen measurement positions. The same is true for end A of pipe 505. For best fit the measurements at the sixteen positions of pipe 504 can be compared to the measurements at the sixteen positions of pipe 505. That is, pipe 504 can be connected to pipe 505 through one of sixteen different rotational positions. If more than sixteen measurements were taken then more rotational positions could be considered. Similarly if less than sixteen, then less rotational positions can be considered. Additionally, a specified local maximum deviation tolerance can be set so that the maximum difference between any measurement position for end A of pipe 504 and end A of pipe 505 is not exceeded in a specific rotational connection.

Step 1220 shows a table where the difference in measurements for each of the sixteen measurements between end A of pipe 504 and end A of pipe 505 have been calculated. These differences can be between the internal radii and/or between the external radii. Because there are sixteen pairs of measurements, for any single angular connection or positioning between end A of pipe 504 and end A of pipe 505, there will be sixteen differences between the radius measure for pipe 504 and the radius measurement for pipe 505. In step 1220 the differences between measurements of end A of pipe 504 and end A of pipe 505 are set forth in the table as EXPR. Each row in the table signifies various differences for a specific angular connection between the two pipe ends. The first row looks at position 1 of end A of pipe 504 being connected to position 1 of end A of pipe 505. Because the pipe ends are facing each other when connected, one set of pipe positions will increase in a clockwise direction while the other set of pipe measurements will increase in a counterclockwise direction. Accordingly, in the first row of the table position 2 of end A of pipe 504 will be connected to position 16 of end A of pipe 505 (and not position 2 of end A of pipe 505). Likewise, position 3 of end A of pipe 504 will connect to position 15 of end A of pipe 505. The remainder of matching connections are set forth in the first row of the table. The sum of the squares of these differences are shown in the column labeled Sum of EXPR(N) and provides an indicator on whether the pipes are a good fit for the particular angular connection.

The second row of the table in step 1220 provides calculated differences where position 1 of end A of pipe 504 is connected to position 2 of end A of pipe 505. The individual entries the second row includes the sixteen differences between position 1 for pipe 504 and position 1 for pipe 505. Similarly, the third row reviews position 1 of end A of pipe 504 being connected to position 3 of end A of pipe 505. Similarly, calculations are set forth in rows four through 16 for the remainder of position 1 of end A of pipe 504 being connected to positions 4 through 16 of end A of pipe 505. At the column labeled Sum of EXPR(N) the sum of the squares are each calculated and presented.

The smallest value of the column labeled Sum of EXPR (N) is an indicator of the best fit between end A of pipe 504 with end A of pipe 505 and can be labeled as the Lowest Sum of EXPR(N) or LS(IR). The row having the lowest Sum of EXPR(N) provides the particular angular connection between end A of pipe 504 to end A of pipe 505 which provides this best fit. Additionally, using the external radii, the Lowest Sum of EXPR(N) or LS(OR) can be calculated. The individual steps for selecting a sequence of pipes to be joined from a universe of pipes 500 will be reviewed below.

Step 1230 shows the choice of LS(IR) or LS(OR). For example, position 1 of end A of pipe 504 may have the best calculation when connected to position 7 of end A of pipe 505. Step 1240 indicates a local dimensional check being performed for the selected LS(IR). This dimensional check ensures that no local difference between the internal radii of end A of pipe 504 and end A of pipe 505 exceeds the specified tolerance limit for any of the sixteen measured radii.

If the localized dimensional tolerance check is satisfied then the analysis proceeds onto step 1250 where a comparison is made between the calculation for the preferred joint end and the specific tested joint end. If the calculation for the tested joint end is greater than the calculation for the preferred joint end then the analysis goes to step 1246 where the specific tested joint end is rejected for joining and returned to universe of pipes 500 for possible connection to another joint. If the calculation for the tested joint end is less than the calculation for the preferred joint end, then the analysis proceeds to step 1260 where the particular tested joint end is now selected as the new preferred joint end. The previously preferred joint end is then returned to universe of pipes 500 for possible connection to another joint end and the analysis proceeds to step 1280 to determine whether there are more joints to be fit.

If the calculation for the tested joint end is equal to the calculation for the preferred joint end then the analysis proceeds to step 1255 where a comparison is made between the best fit calculations for the outside radii between connections with either the preferred joint end or the tested joint end—the joint end with the smaller number being picked. If the calculation for the tested joint end is greater than the preferred joint end maintains its preferred status and the analysis proceeds to step 1246. If the calculation for the tested joint end is smaller or equal then the analysis proceeds to step 1256, the tested joint end is set as the new preferred joint end and the old preferred joint end is returned to universe of pipes 500 for possible matching as indicated in step 1270.

The above analysis is done for each possible combination of end A of pipe 504 to each end of each remaining pipe in universe of pipes 500. Step 1280 indicates that for the specific subject joint (e.g., end A of pipe 504) every other pipe end has been considered. At this point the analysis proceeds to step 1290 where a sequence number is assigned to the subject joint (e.g., end A of pipe 504) and the end of other pipe from the universe of pipes 500 which provided the best fit using the best fit algorithm, such as sum of the squares method, (e.g., end B of pipe 509). At this point the opposite end of the selected pipe is now set as the new subject joint and the entire analysis is repeated for this new subject joint. However, the original subject joint (e.g., pipe 504) is removed from further consideration because it has already been sequenced.

If one of the differences exceeds the specified tolerance (for example, position 1 of pipe 504 connected to position 7 of pipe 505) then end A of pipe 504 is rejected from connection to end A of pipe 505; and end A of pipe 505 is placed back in into the universe of pipes 500 for possible connection to another end. Step 1245 indicates that one end of a pipe is rejected for the particular connection being considered and placed back into the universe of pipes 500 for possible connection to another end. In this case step 1246 indicates that the particular end of the test joint (i.e., end A of pipe 505) is retained for comparison to another end from the universe of pipes 500. In this case step 1280 indicates that a determination is made regarding whether this was the final joint end to be compared. If not then step 1215 indicates that a next joint end from the universe of pipes 500 is selected as the test joint end and the analysis proceeds to step 1220.

In this manner the entire joint population in universe of pipes 500 can be sequenced for best fit. Step 1300 indicates that the entire population was sequenced and step 1310 indicates that the results are to be reported, such as in the form of a sequencing report.

The following is a list of reference numerals:

| LIST FOR REFERENCE NUMERALS | |
|---|---|
| (Part No.) | (Description) |
| 1 | indicia |
| 2 | indicia |
| 3 | end |
| 4 | end |
| 5 | pipe |
| 6 | longitudinal bore |
| 7 | exterior surface |
| 8 | interior surface |
| 10 | measurement apparatus |
| 20 | body |
| 25 | base |
| 26 | shaft |
| 27 | biased arm |
| 30 | exterior measurement device |
| 35 | laser beam |
| 40 | interior measurement device |
| 45 | laser beam |
| 50 | handle |
| 60 | clamp |
| 70 | handle for clamp |
| 80 | cup |
| 90 | arm |
| 92 | arm |
| 95 | arm |
| 100 | plate |
| 105 | plate |
| 120 | spring |
| 150 | arms |
| 130 | fastener |
| 140 | base |
| 142 | openings |
| 143 | roller |
| 150 | extension |
| 152 | bore |
| 160 | tab |
| 165 | tab |
| 166 | tab |
| 170 | arrow |
| 180 | arrow |
| 190 | arrows |
| 200 | catch |
| 300 | pivot point |
| 301 | measurement point |
| 302 | measurement point |
| 303 | measurement point |
| 304 | measurement point |
| 305 | measurement point |
| 306 | measurement point |
| 307 | measurement point |
| 308 | measurement point |
| 309 | measurement point |
| 310 | measurement point |
| 311 | measurement point |
| 312 | measurement point |
| 313 | measurement point |
| 314 | measurement point |
| 315 | measurement point |
| 316 | measurement point |
| 501 | pipe |
| 502 | pipe |
| 503 | pipe |
| 504 | pipe |
| 505 | pipe |
| 511 | indicia |
| 512 | indicia |
| 513 | indicia |
| 514 | indicia |
| 540 | operator |
| 550 | control unit |
| 555 | scanner |
| 560 | back pack |
| 570 | support |
| 580 | support |

-continued

LIST FOR REFERENCE NUMERALS

| (Part No.) | (Description) |
|---|---|
| 590 | support |
| 600 | template |
| 601 | opening |
| 602 | opening |
| 603 | opening |
| 604 | opening |
| 605 | opening |
| 606 | opening |
| 607 | opening |
| 608 | opening |
| 609 | opening |
| 610 | opening |
| 611 | opening |
| 612 | opening |
| 613 | opening |
| 614 | opening |
| 615 | opening |
| 616 | opening |
| 620 | handle |
| 625 | plate |
| 630 | pin |
| 640 | pin |
| 700 | standard |
| 701 | position |
| 702 | position |
| 703 | position |
| 704 | position |
| 705 | position |
| 706 | position |
| 708 | position |
| 709 | position |
| 710 | position |
| 711 | position |
| 712 | position |
| 713 | position |
| 714 | position |
| 715 | position |
| 716 | position |
| 800 | universe of pipe |
| 900 | measurement apparatus |
| 905 | body |
| 910 | base |
| 915 | shaft |
| 921 | exterior measurement device |
| 922 | exterior measurement device |
| 923 | exterior measurement device |
| 924 | exterior measurement device |
| 925 | exterior measurement device |
| 926 | exterior measurement device |
| 927 | exterior measurement device |
| 928 | exterior measurement device |
| 929 | exterior measurement device |
| 930 | exterior measurement device |
| 931 | exterior measurement device |
| 932 | exterior measurement device |
| 933 | exterior measurement device |
| 934 | exterior measurement device |
| 935 | exterior measurement device |
| 936 | exterior measurement device |
| 941 | laser beam |
| 942 | laser beam |
| 943 | laser beam |
| 944 | laser beam |
| 945 | laser beam |
| 946 | laser beam |
| 947 | laser beam |
| 948 | laser beam |
| 949 | laser beam |
| 950 | laser beam |
| 951 | laser beam |
| 952 | laser beam |
| 953 | laser beam |
| 954 | laser beam |
| 955 | laser beam |
| 956 | laser beam |

-continued

LIST FOR REFERENCE NUMERALS

| (Part No.) | (Description) |
|---|---|
| 961 | interior measurement device |
| 962 | interior measurement device |
| 963 | interior measurement device |
| 964 | interior measurement device |
| 965 | interior measurement device |
| 966 | interior measurement device |
| 967 | interior measurement device |
| 968 | interior measurement device |
| 969 | interior measurement device |
| 970 | interior measurement device |
| 971 | interior measurement device |
| 972 | interior measurement device |
| 973 | interior measurement device |
| 974 | interior measurement device |
| 975 | interior measurement device |
| 976 | interior measurement device |
| 981 | laser beam |
| 982 | laser beam |
| 983 | laser beam |
| 984 | laser beam |
| 985 | laser beam |
| 986 | laser beam |
| 987 | laser beam |
| 988 | laser beam |
| 989 | laser beam |
| 990 | laser beam |
| 991 | laser beam |
| 992 | laser beam |
| 993 | laser beam |
| 994 | laser beam |
| 995 | laser beam |
| 996 | laser beam |
| 1000 | handle |
| 1005 | handle |
| 1010 | clamp |
| 1020 | handle for clamp |
| 1030 | cup |
| 1040 | arm |
| 1050 | aim |
| 1060 | aim |
| 1070 | plate |
| 1080 | plate |
| 1085 | plate |
| 1090 | spring |
| 1100 | arms |
| 1110 | fastener |
| 1120 | base |
| 1130 | openings |
| 1140 | rod |
| 1150 | extension |
| 1200 | best fit analysis |
| 1210 | step |
| 1215 | step |
| 1220 | step |
| 1230 | step |
| 1240 | step |
| 1245 | step |
| 1246 | step |
| 1250 | step |
| 1255 | step |
| 1256 | step |
| 1260 | step |
| 1270 | step |
| 1280 | step |
| 1290 | step |
| 1300 | step |
| 1310 | step |
| D1 | distance measured by laser beam 45 |
| D2 | distance from pivot point of measuring apparatus 10 to laser 40 |
| D3 | distance measured by laser beam 35 |
| D4 | distance from pivot point of measuring apparatus 10 to laser 30 |

All measurements disclosed herein are at standard temperature and pressure, at sea level on Earth, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of determining a sequence to join a set of items comprising:
   (a) each item in the set being marked with identifying indicia;
   (b) using a measuring apparatus to take a plurality of measurements at a plurality of points on a surface on each item, the measuring apparatus taking a measurement;
   (c) storing the plurality of measurements in a database;
   (d) performing a best fit analysis using the plurality of measurements stored in the database; and
   (e) creating a sequencing report listing the sequence to join the items in the set.

2. The method of claim 1, wherein in step "b" the measurements are taken without contacting the points being measured but the measurement apparatus does contact the item being measured.

3. The method of claim 1, wherein the items are pipes having internal and external diameters.

4. The method of claim 3, wherein in step "b" sixteen measurements are taken at locations equally spaced in a radial direction for both internal and external diameters.

5. The method of claim 1, wherein in step "d" the best fit analysis includes a sum of the squares algorithm based on the differences in measurements between individual pipes.

6. The method of claim 3, wherein in step "b" the measurements for a first end of a first pipe are selected and compared to the measurements for first and second ends of every other pipe in the set and a first end of a first matching pipe is selected for joining to the first selected pipe, and then the measurements for the second end of the first matching pipe are compared to the measurements for the first and second ends of every remaining pipe in the set and a first end of a second match pipe is selected.

7. The method of claim 6, wherein in step "d" the unmatched of each matching pipe in the set is serially matched against the remaining pipes in the set.

8. The method of claim 3, wherein in step "d" each possible combination of joining pipes in the set are reviewed before determining a sequencing order for the pipes.

9. The method of claim 1, wherein in step "d" the best fit analysis is performed on a plurality of groups of measurements, each group of measurements corresponding to a group of items from the set of items.

10. The method of claim 9, wherein in step "e" the sequencing report lists sequences according to each group in the plurality of groups of measurements.

11. The method of claim 1, further comprising the step of removing one of the items listing in the sequencing report and performing a best fit analysis on the measurements corresponding to the items sequenced before and after the removed item and a set of measurements taken from a replacement set of items.

12. The method of claim 1, wherein before the best fit analysis in step "d" is performed, the measurements stored in the database in step "c" are compared to specified tolerances and measurements not falling within the specified tolerances are removed from the best fit analysis performed in step "d."

13. The method of claim 12, wherein a report is generated of items having measurements removed from the best fit analysis in step "d."

14. A measurement apparatus for measuring a tubular member, the apparatus comprising:
   (a) a body;
   (b) a clamp, the clamp being rotatably attachable to the body at a point of rotation and the clamp being removably attachable to the tubular member to be measured;
   (c) the body being movable in a plurality of positions around the point of rotation in relation to the clamp;
   (d) the body having a first measuring device; the first measuring device being moveable to measure a plurality of distances between the point of rotation and the item to be measured when the body is moved into the plurality of positions; and
   (e) the first measuring device sending its measurements to a storage device.

15. The measurement apparatus of claim 14, further comprising a second measuring device, the second measuring device being moveable around the point of rotation to measure a second plurality of distances between the point of rotation and the item to be measured.

16. The measurement apparatus of claim 14, further comprising a second measuring device, the second measuring device being moveable to measure a second plurality of distances between the body and the item to be measured.

17. The measurement apparatus of claim 14, wherein the first measuring device includes a laser measurement device.

18. The measurement apparatus of claim 14, wherein the clamp tends to center the body with respect to the tubular member to be measured.

19. The measurement apparatus of claim 14, further comprising a controller, the controller being operably connected to the first measuring device, the controller initiating the first measuring device, receiving the measurements from the first measuring device, and sending these measurements to the storage device.

20. The measuring apparatus of claim 19, wherein the controller performs various calculations before sending the measurements to the storage device.

* * * * *